United States Patent
Bertels

(10) Patent No.: US 10,808,716 B2
(45) Date of Patent: Oct. 20, 2020

(54) ENTHALPY EXCHANGER

(71) Applicant: ECO-LOGICAL ENTERPRISES B.V., Amersfoort (NL)

(72) Inventor: Augustinus Wilhelmus Maria Bertels, Doorwerth (NL)

(73) Assignee: ECO-LOGICAL ENTERPRISES B.V., Amersfoort (NL)

(*) Notice: Subject to any disclaimer, the term of this patent is extended or adjusted under 35 U.S.C. 154(b) by 116 days.

(21) Appl. No.: 15/555,109

(22) PCT Filed: Mar. 1, 2016

(86) PCT No.: PCT/NL2016/050144
§ 371 (c)(1),
(2) Date: Sep. 1, 2017

(87) PCT Pub. No.: WO2016/140572
PCT Pub. Date: Sep. 9, 2016

(65) Prior Publication Data
US 2018/0106266 A1    Apr. 19, 2018

(30) Foreign Application Priority Data
Mar. 2, 2015    (NL) .................................... 2014380

(51) Int. Cl.
F04D 29/32    (2006.01)
F04D 25/16    (2006.01)
(Continued)

(52) U.S. Cl.
CPC ....... F04D 29/325 (2013.01); F04D 25/0606 (2013.01); F04D 25/166 (2013.01);
(Continued)

(58) Field of Classification Search
CPC .. F04D 25/0606; F04D 25/166; F04D 29/325; F04D 29/522; F04D 29/646;
(Continued)

(56) References Cited

U.S. PATENT DOCUMENTS 2,219,826 A * 10/1940 Swinburne ................ F28D 5/00
261/151
2,672,328 A * 3/1954 Mart ........................ F04D 25/04
261/25
(Continued)

FOREIGN PATENT DOCUMENTS

DE    10 2006047236 A1    4/2008
JP    S50-80051 U    7/1975
(Continued)

OTHER PUBLICATIONS

International Search Report, dated Jun. 29, 2016, from corresponding PCT/NL2016/050144 application.

*Primary Examiner* — Charles S Bushey
(74) *Attorney, Agent, or Firm* — Nixon & Vanderhye

(57) ABSTRACT

Disclosed is an enthalpy exchanger for changing the enthalpy of a throughflow medium to cool process water coming from an industrial process by passing air, including: an air inlet; an enthalpy exchanger panel guiding medium so the medium exchanges enthalpy with airflows let through by the air inlet; an air throughflow space connecting to the enthalpy exchanger panel so air can only flow into the air throughflow space via the air inlets and the enthalpy exchanger panels; a fan connecting to the air throughflow space and which draws in and blows out air via the air inlet, the enthalpy exchanger panel and the air throughflow space; and a rotation-symmetrical airflow-guiding element extends both into the air throughflow space and outside the enthalpy exchanger; the airflows in the air throughflow space con-
(Continued)

verge at any position and are substantially free of vortices, turbulences and areas without suction.

20 Claims, 34 Drawing Sheets

(51) Int. Cl.
    *F28C 1/10*     (2006.01)
    *F04D 29/52*     (2006.01)
    *F04D 25/06*     (2006.01)
    *F04D 29/64*     (2006.01)
    *F04D 29/66*     (2006.01)

(52) U.S. Cl.
    CPC ......... *F04D 29/522* (2013.01); *F04D 29/646* (2013.01); *F04D 29/66* (2013.01); *F28C 1/10* (2013.01); *F28F 2250/08* (2013.01); *F28F 2265/28* (2013.01)

(58) Field of Classification Search
    CPC ........ F04D 29/66; F28C 1/10; F28F 2250/08; F28F 2265/28
    USPC ...................................... 261/30, 84, DIG. 11
    See application file for complete search history.

(56) References Cited

U.S. PATENT DOCUMENTS

| | | | | |
|---|---|---|---|---|
| 3,115,534 A | * | 12/1963 | Bottner | F28C 1/04 261/24 |
| 3,321,931 A | * | 5/1967 | Lehmkuhl | F04D 29/545 62/281 |
| 3,384,165 A | * | 5/1968 | Mathews | F28B 1/06 165/122 |
| 4,130,613 A | * | 12/1978 | Hourai | F28C 1/10 261/109 |
| 4,252,751 A | | 2/1981 | Shito | |
| 4,543,218 A | * | 9/1985 | Bardo | E04H 5/12 261/111 |
| 5,236,625 A | | 8/1993 | Bardo et al. | |
| 5,480,594 A | | 1/1996 | Wilkerson et al. | |
| 6,880,813 B2 | * | 4/2005 | Yazici | F28C 1/10 181/224 |
| 6,938,885 B2 | * | 9/2005 | Koo | F28C 1/06 261/112.2 |
| 6,942,200 B2 | * | 9/2005 | Gu | F28C 1/04 165/122 |
| 7,510,174 B2 | * | 3/2009 | Kammerzell | F28C 1/02 165/166 |
| 7,603,774 B2 | * | 10/2009 | Facius | F28C 1/14 261/153 |
| 7,887,030 B2 | * | 2/2011 | Hentschel | F28C 1/04 165/900 |
| 2006/0053727 A1 | | 3/2006 | Bland et al. | |
| 2008/0075585 A1 | | 3/2008 | Acre | |
| 2010/0014967 A1 | | 1/2010 | Blass et al. | |
| 2010/0193163 A1 | | 8/2010 | Rollins et al. | |
| 2012/0125033 A1 | | 5/2012 | Tanno et al. | |
| 2013/0142652 A1 | | 6/2013 | Nicholls et al. | |
| 2020/0070965 A1 | * | 3/2020 | Bertels | F03B 11/02 |

FOREIGN PATENT DOCUMENTS

| | | |
|---|---|---|
| JP | S52-42931 B2 | 10/1977 |
| JP | S60-57192 A | 4/1985 |
| JP | S61-162774 U | 10/1986 |
| JP | S61-200413 U | 12/1986 |
| JP | H06-94391 A | 4/1994 |
| JP | H11-325794 A | 11/1999 |
| JP | 2004-125317 A | 4/2004 |
| JP | 2005-009750 A | 1/2005 |
| JP | 2008-138951 A | 6/2008 |
| JP | 2008-202855 A | 9/2008 |
| JP | 2011-106428 A | 6/2011 |
| JP | 2011-517758 A | 6/2011 |
| WO | 02/38962 A2 | 5/2002 |
| WO | 2011/013672 A1 | 2/2011 |

* cited by examiner

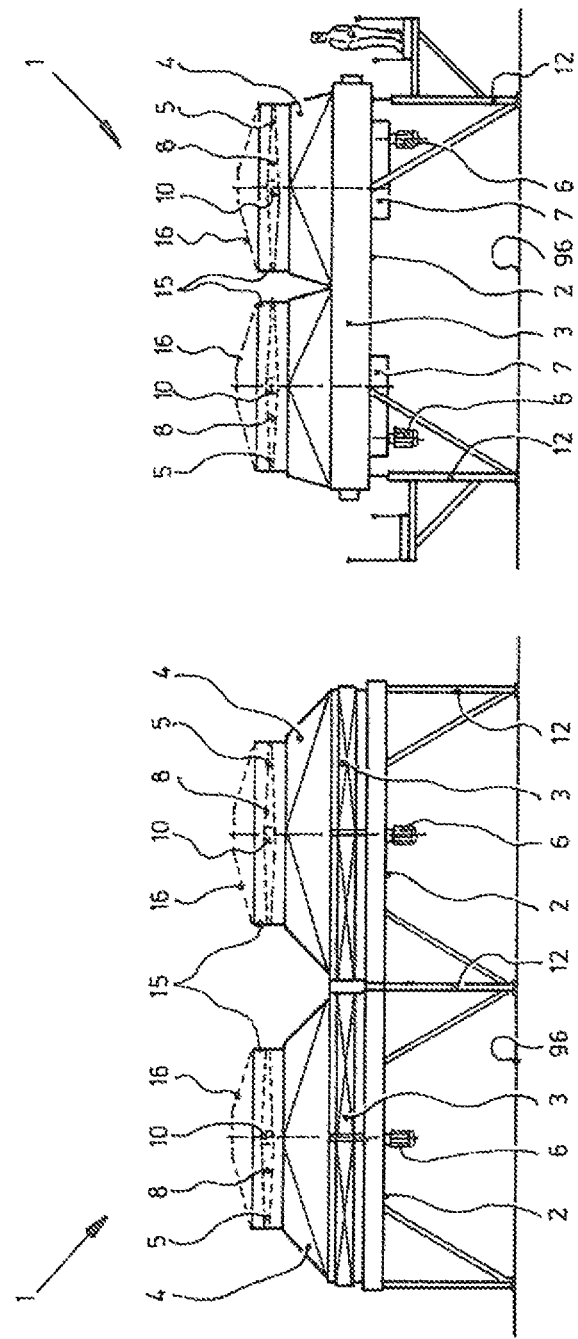

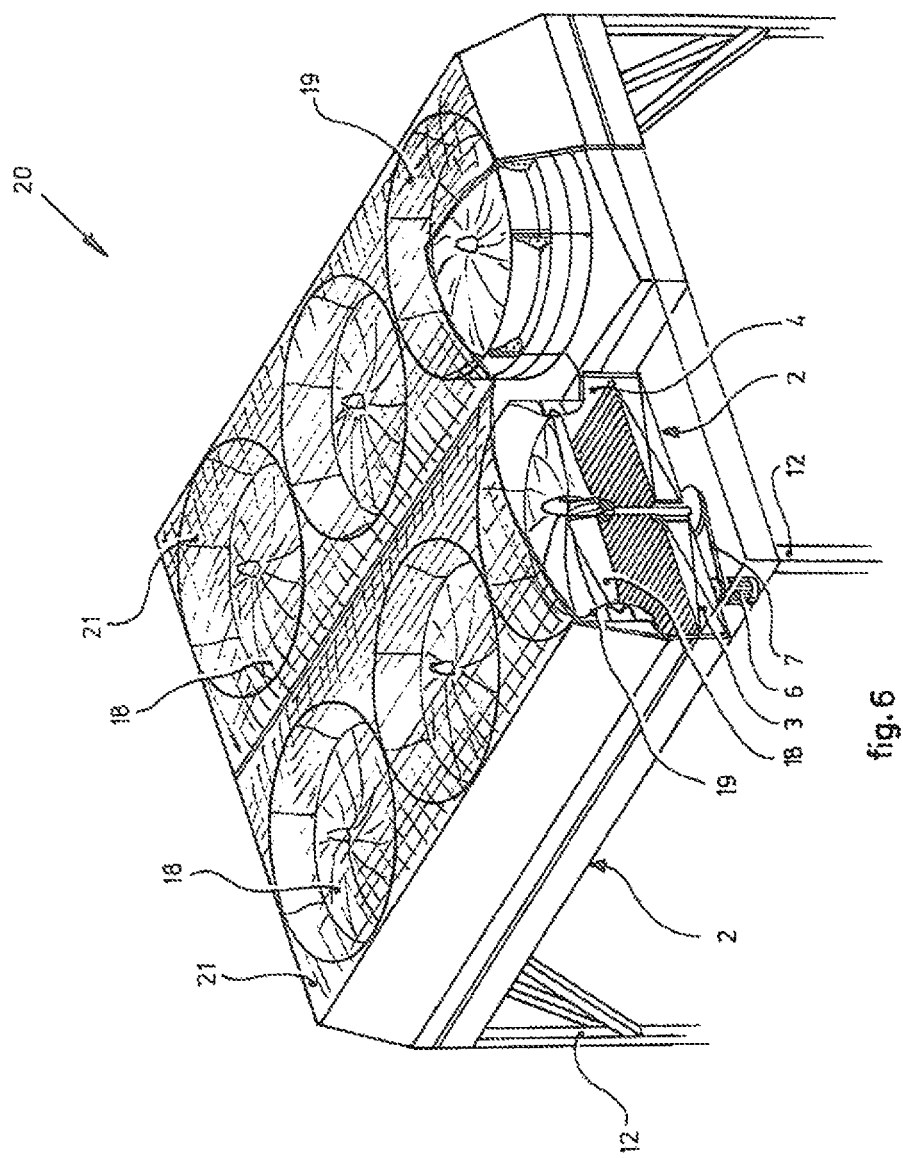

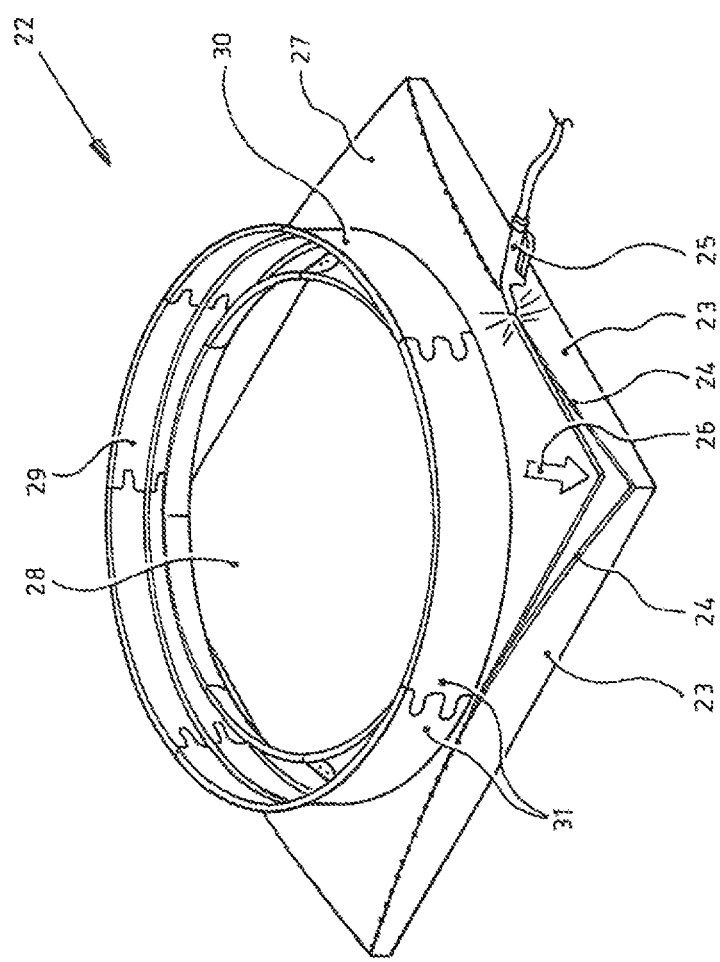

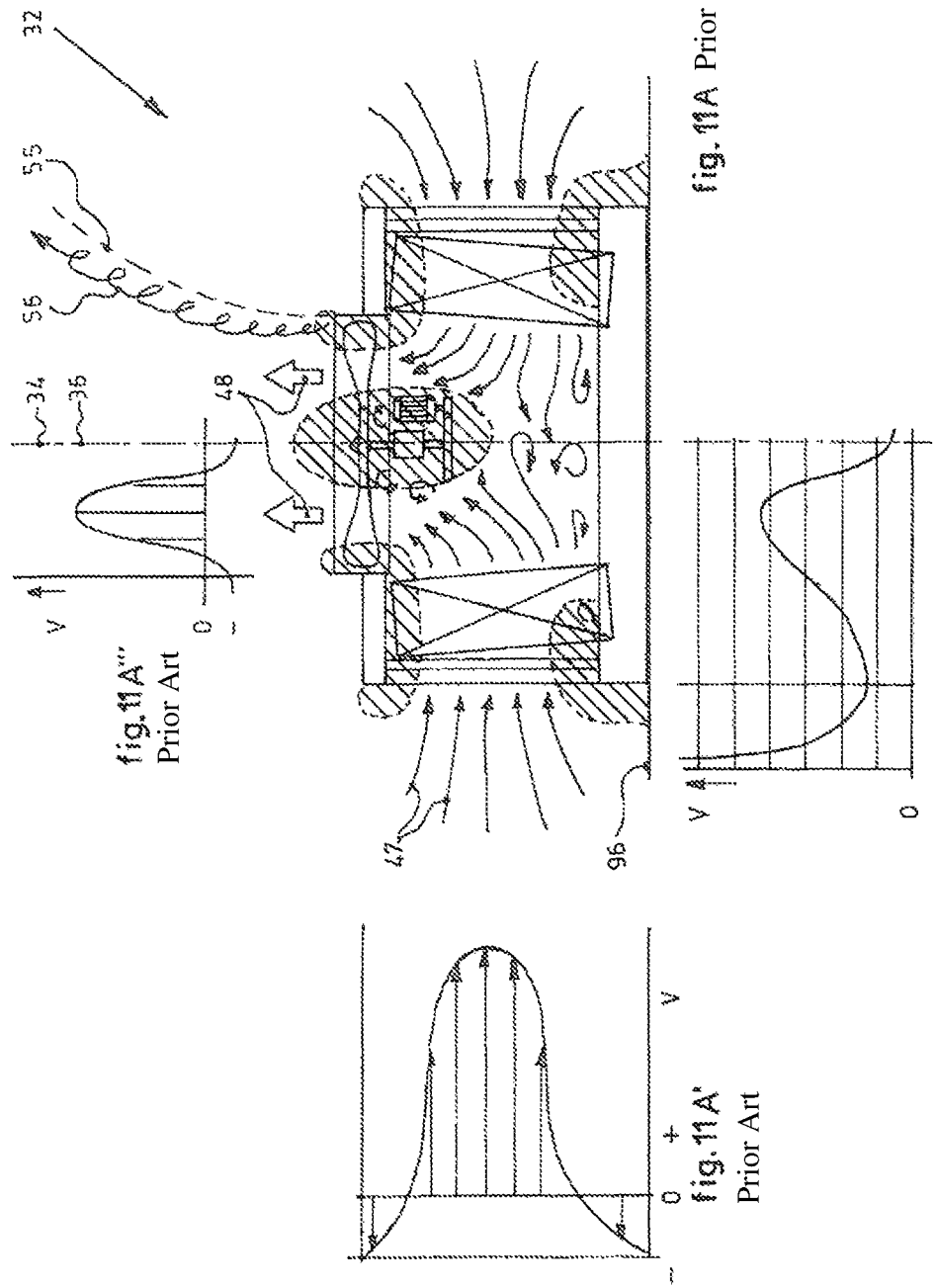

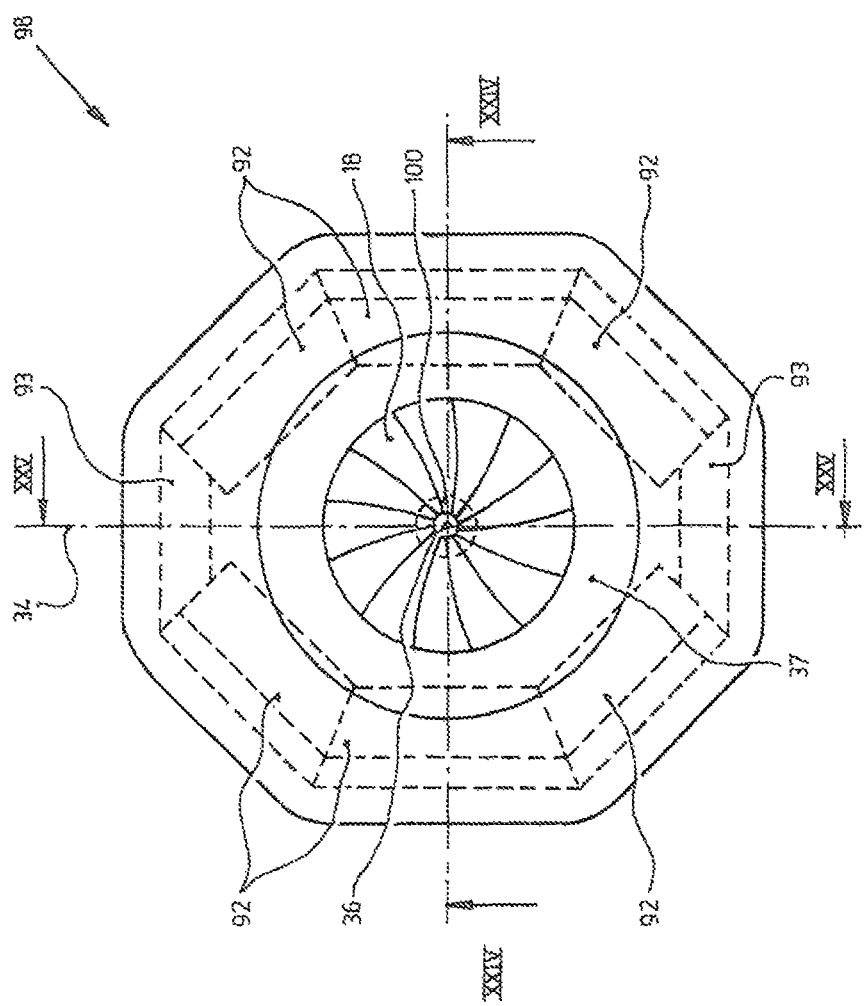

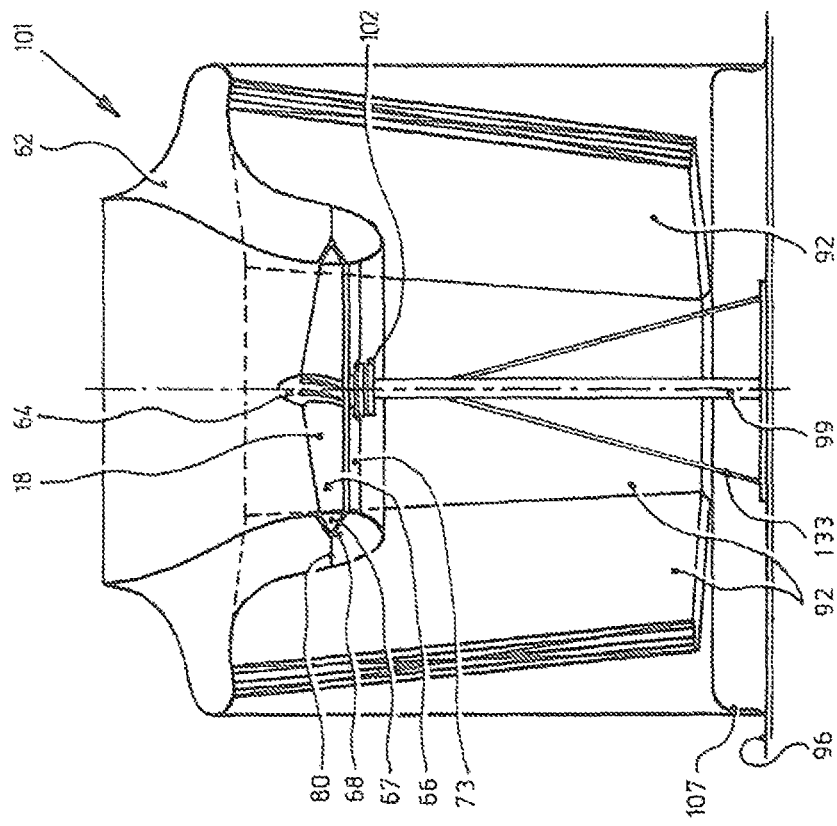
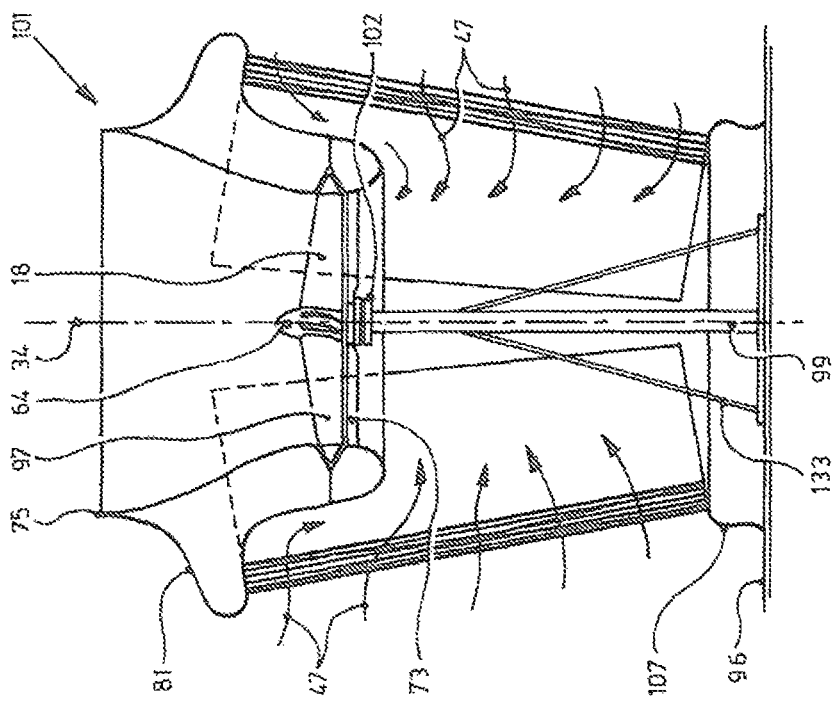

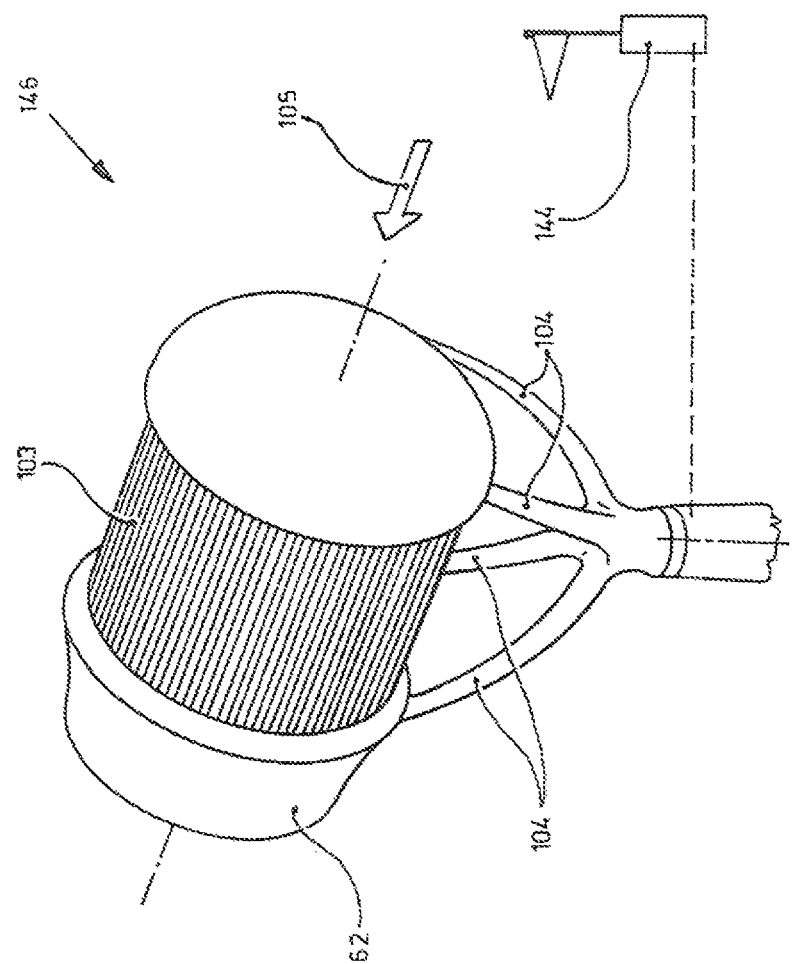

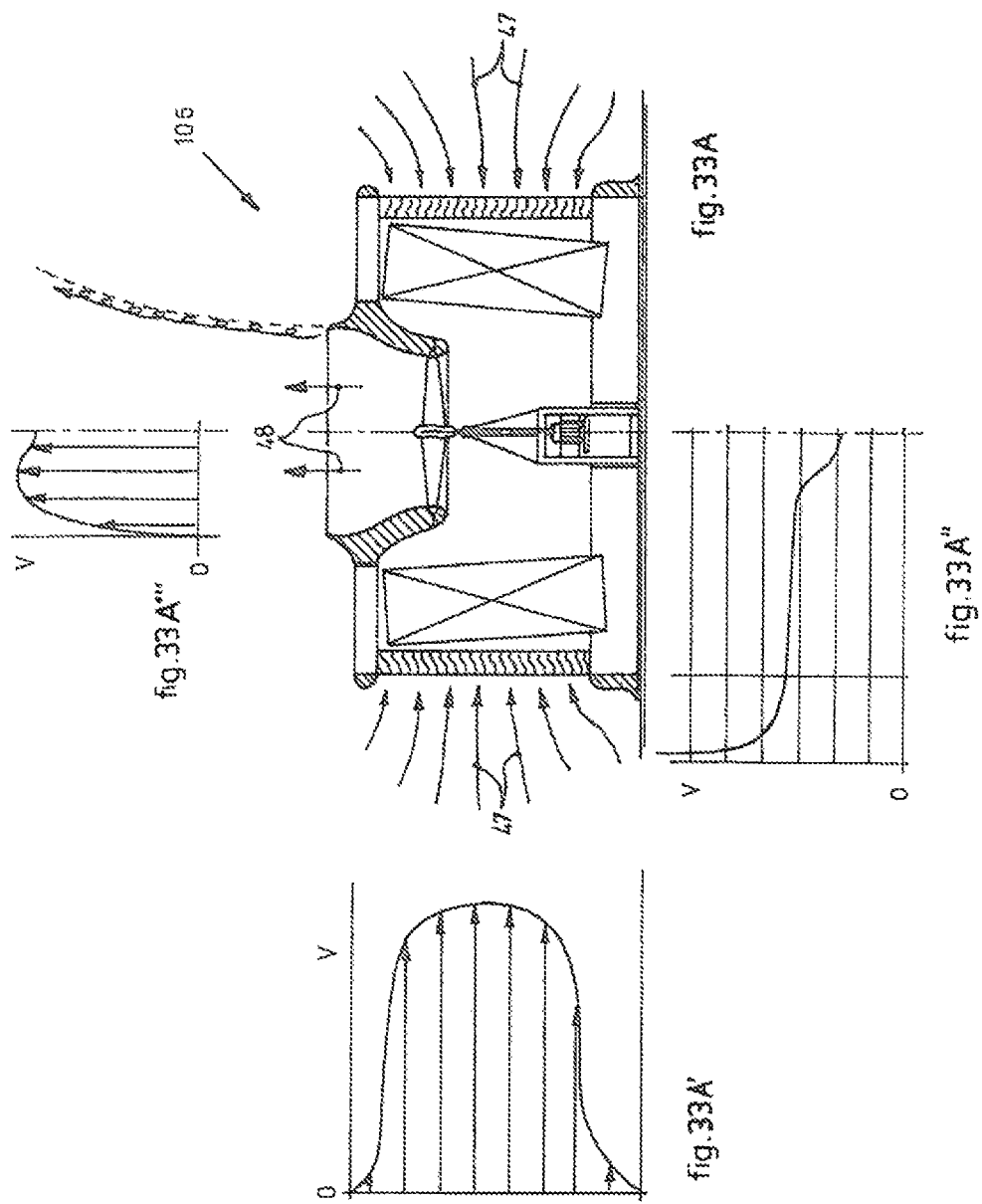

ENTHALPY EXCHANGER

BACKGROUND OF THE INVENTION

The invention relates to an enthalpy exchanger for changing the enthalpy of a throughflow medium, i.e. a liquid, a gas or a two-phase medium, for instance a dry or wet cooling tower for cooling process water coming from an industrial process by means of passing air, which enthalpy exchanger comprises:

at least one air inlet;

at least one enthalpy exchanger panel connecting to each air inlet and configured to guide medium such that during operation this medium exchanges enthalpy with airflows let through by the or each air inlet;

an air throughflow space connecting to the at least one enthalpy exchanger panel;

such that air can only flow into the air throughflow space via the air inlets and the enthalpy exchanger panels;

a fan which connects to the air throughflow space and has a central axis which is also the rotation axis of the rotor of the fan, which draws in and blows out air via the air inlets, the enthalpy exchanger panels and the air throughflow space; and electrical drive means added to the fan.

Such an enthalpy exchanger is generally usual and known in many embodiments.

DESCRIPTION OF RELATED ART

All known enthalpy exchangers of the above described type have the drawback that they produce a lot of sound. The sound comprises a very noise-like component lying in large part in the spectrum of the higher frequencies, whereby the sound can be very annoying. A sound pressure level at a distance of several metres in the order of 100-110 dB SPL is usual.

A further drawback of the known enthalpy exchangers is that their efficiency leaves a great deal to be desired, and that disproportionally heavy electric motors which consume a large amount of energy are therefore used to drive the fans.

The noise-like component in the spectrum of the emitted sound of prior art enthalpy exchangers is mainly caused by two significant aspects. Many turbulences and vortices occur in the air throughflow space as a result of an ill-considered design, wherein it is particularly the strong turbulences which cause a noise-like sound.

Use is further invariably made in the prior art of generally known and relatively inexpensive fans, which are afflicted by a strong flow round the end zones of the blades, whereby the so-called tip vortices and strong turbulence are generated. The emitted sound consists on the one hand of said noise-like component, although it is modulated with the rotation speed of the fan, multiplied by the number of blades. The sound is reminiscent of the characteristic thumping sound generated by the often three or four-bladed rotor of a helicopter, which is afflicted by this phenomenon to an extreme extent.

A final aspect relating to the undesired sound emission is that the fans driven with a large amount of electrical energy are mounted on the housing of the enthalpy exchanger. A very large part of the energy supplied to the drive motors of the fans is translated into strong vibrations which are propagated in the steel housing panels, which thereby also cause heavy air vibrations with relatively low frequency, similar to the very loud sounds with extremely low frequencies, in the order of less than 40 Hz, which are emitted by the jet engines of large passenger aircraft. Such sounds are often not audible by ear, but are nevertheless very annoying since they translate into vibrations in the body and are therefore manifest in very unpleasant manner.

SUMMARY OF THE INVENTION

It is an object of the invention to modify a prior art enthalpy exchanger such that it is not afflicted by the above described drawbacks, or at least to considerably lesser extent. In this respect the invention provides an enthalpy exchanger of the type stated in the preamble, which has the feature that the ratio of the effective throughflow area of the fan and the total effective throughflow area of the relevant air inlets amounts to a maximum of about 0.3;

added to the fan is a rotation-symmetrical airflow-guiding element which extends both upstream relative to the fan, in the air throughflow space, and downstream relative to the fan, on the outer side of the enthalpy exchanger;

the airflow-guiding element has a streamlined shape in both its upstream zone and its downstream zone, such that dead zones are prevented; and the fan comprises a number of, preferably at least ten, aerodynamically formed blades arranged in angularly equidistant manner on a coaxially placed hub and with outer end zones which are mutually connected by a concentric ring which fits with some clearance into a correspondingly formed annular recess in the airflow-guiding element, such that the inner surfaces of the ring and the airflow-guiding element connect substantially smoothly to each other without appreciably affecting the airflow through the fan;

this such that the airflows in the air throughflow space converge at any position and are substantially free of vortices, turbulences and areas without suction.

The specification according to the invention that the airflows in the air throughflow space must converge at any position, for which purpose the ratio of the effective throughflow area of the fan and the total effective throughflow area of the relevant air inlets amounts to a maximum of about 0.3, is prompted by the consideration that it has been found that a non-converging airflow, and certainly a diverging airflow, has an uncontrolled and thereby unstable character, whereby vortices, vortex streets, turbulent areas and dead zones varying periodically over time or in stochastic manner can result. This problem is solved with the stated specifications according to the invention.

With the airflow-guiding element which is added to the fan it is achieved that the supplied airflow is very stable and calm, which, certainly in combination with the airflow guiding of the airflow blown from the fan and into the air throughflow space, creates a high degree of calm and stability in the airflow or airflows flowing via the air inlets and the or each enthalpy exchanger panel through the air throughflow space.

The invention further specifies a highly advanced fan comprising a number of, for instance twenty, aerodynamically formed blades arranged in angularly equidistant manner on a coaxially placed hub and with outer end zones which are mutually connected by a concentric ring which fits with some clearance into a correspondingly formed annular recess in the airflow-guiding element, in a manner such that the inner surfaces of the ring and the airflow-guiding element connect substantially smoothly to each other without appreciably affecting the airflow through the fan.

Such a fan experiences no tip vortices, and experience has shown by now that such a fan can deliver a superior performance in terms of efficiency and low sound emission, even at relatively low rotation speeds. With such a relatively slowly rotating fan and an exclusively convergent and thereby accelerating airflow in the air throughflow chamber a completely stable flow is always obtained.

As a result of the highly dubious quality of the fans used, many known enthalpy exchangers further experience a high degree of so-called pre-rotation, i.e. a rotating airflow at the entrance of the fan. The fan efficiency is thereby relatively low and large dead zones and completely unpredictable and uncontrollable chaotic airflows occur in the air throughflow space.

Because the aerodynamically formed airflow-guiding element is placed in the air throughflow space recessed relative to the plane of the fan and extends therein over a considerable length, an extra acceleration of the through-fed air occurs in this air throughflow space. This additional convergence and monotonous acceleration of the airflow over the whole path length through the air throughflow space is found to be essential in realizing a stable flow pattern without structural vortices, vortex streets varying over time, turbulences and even dead zones varying through time. With such an aerodynamic airflow-guiding element optimum benefit is gained from the power of the relevant fan arranged for suction.

An enthalpy exchanger is however recommended of the described type according to the invention, wherein
at least two air inlets are disposed symmetrically in pairs on either side of a median plane defined in the enthalpy exchanger;
at least two enthalpy exchanger panels are disposed symmetrically in pairs relative to the median plane, optionally in positions such that their mutual distance increases in the direction of the fan;
the central axis of the fan extends in the median plane; and
the fan is disposed symmetrically relative to the median plane.

In such an embodiment the airflow drawn in via an air inlet is deflected toward the fan by the suction action of the fan and then blown out via the fan.

There is some risk of there being a small area with an undefined flow, in which the suction is substantially non-existent, in the area of the median plane on the underside of the enthalpy exchanger panels inside the air throughflow space. This undesired situation can be solved with an embodiment wherein
an airflow deflection element is disposed on the side of the air throughflow space remote from the fan for the purpose of smoothly deflecting each airflow from the adjoining end zone of the relevant enthalpy exchanger panel and in the direction of the central zone of the fan;
the deflection element has a prismatic form, i.e. has the same cross-sectional form at any longitudinal position in the median plane; and
the deflection element has a form which is mirror-symmetrical relative to the median plane and which has two smoothly rounded convex lower edges which transpose smoothly into respective concave deflection surfaces, which converge in a ridge which is located in the median plane and where the concave deflection surfaces form an acute angle with each other.

Complete control of the airflows fed in from two sides is achieved with such an airflow deflection element, which is located in the relatively narrow zone between the enthalpy exchanger panels in the side of the air throughflow space remote from the fan, without the risk of a locally uncontrolled flow situation.

The above described enthalpy exchanger can be of the so-called dry type. According to the invention, such an enthalpy exchanger preferably has the special feature that
the medium can flow through the enthalpy exchanger panels and the panels comprise for instance thermally conductive tubes provided on their outer sides with area-enlarging, thermally conductive means, for instance slats, fins, pins or wires, such that enthalpy is exchanged between the medium and the passing air during operation; and
the airflow-guiding element comprises the one manifold of an enthalpy exchanger panel and the deflection element comprises the other manifold of this enthalpy exchanger panel.

An enthalpy exchanger often comprises a frame of which a housing forms part. As already described above, particularly when large panels are used is there a risk of the drive means of the at least one fan bringing about a mechanical excitation of these panels such that the sound vibrations caused thereby can result in a very high sound level with relatively low frequencies. Besides the undesirable character of the sound emission it is also found that metal panels, which are exposed to such vibrations, particularly such heavy vibrations, for a longer period of time, are particularly susceptible to metal fatigue. This results in premature ageing and can result in cracks in the metal, and thereby even the risk of local disintegration of panels and other parts of the enthalpy exchanger. In order to prevent such evidently undesirable vibrations the invention provides in yet another aspect an enthalpy exchanger which has the special feature that
the device comprises a frame supported by the ground;
the central axis of the fan extends in vertical direction; and
the fan and the drive means are supported directly by the ground.

Because the fan with the drive means is in this structure completely disconnected from the frame, and particularly from the metal plates forming part of the frame, a very considerable reduction in sound emission is realized. A reduction of a minimum of 25 dB SPL can easily be realized hereby.

Reference has already been made above to the so-called dry enthalpy exchangers. The invention however also relates to wet enthalpy exchangers, which are known in a determined embodiment as "wet cooling towers". An enthalpy exchanger of the wet type is embodied according to the invention such that
the medium flows via medium application means, for instance sprayers, over the outer surfaces of the enthalpy exchanger panels in the form of a film, and evaporates at least partially while extracting enthalpy from the unevaporated medium, which unevaporated medium is collected by medium collecting means and is optionally discharged for reuse.

This latter embodiment can advantageously have the special feature that
the enthalpy exchanger panels around which flow of medium and the airflows occurs are embodied as corrugated plates with a corrugated profile, wherein the corrugations have wave shapes which are identical and disposed adjacently of each other in the principal plane of the corrugated plates.

Process water to be cooled is for instance spread over the corrugated plates, for instance by means of spraying. Limescale present in the water will be deposited on the corrugated plates and form a rough layer thereon, which causes the water to be cooled which is distributed over the plates to form a water film on each wetted surface.

Such an embodiment achieves a regular, controlled flow of the medium, for instance cooling water coming from an industrial process, with wetting distributed as well as possible over the evaporation surface. The process water to be cooled partially evaporates, whereby cooling occurs. The unevaporated, cooled process water is collected by a collecting container and optionally discharged for reuse, wherein the loss through evaporation is supplemented from external means, for instance the mains water supply or groundwater.

The cooling effect by the water film amounts to about 80%. The contribution of the evaporation amounts to considerably less, i.e. about 20%. By way of guidance: an example of the effectiveness of a wet enthalpy exchanger shows that a cooling of 50° C. to 45° C. can for instance occur. This is sufficient in practice.

In a preferred embodiment the enthalpy exchanger has the special feature that the plates consist of PVC.

A known and very commonly used large prior art enthalpy exchanger comprises a pattern of mutually parallel, identical horizontally extending louvres placed on the outer side at each air inlet. These louvres comprise on the entry side, i.e. the zone where the air enters the enthalpy exchanger from outside, a number of horizontal flat strips placed one above the other and each connecting to a part placed downstream and bent downward at about 45°, whereby the flow is deflected in downward direction.

This arrangement of louvres placed one above the other presumably has for its object to prevent light coming from outside, particularly direct sunlight, reaching the entry side of the enthalpy exchanger panels which were sprayed with water and are therefore wet, which entails the risk of uncontrolled algal growth. The drawback of these known structure of louvres is that the incoming flow is very adversely affected thereby. Due to the angular forms a high flow resistance occurs in combination with vortices and turbulence. In addition, the flow which has to reach the enthalpy exchanger panels in at least more or less transverse direction is deflected through an angle of 45° in the direction of the end zones of the relevant enthalpy exchanger panel remote from the fan. This is a rheologically highly undesirable situation.

In this respect the invention proposes an enthalpy exchanger of the described type, wherein a pattern of mutually parallel, identical, preferably horizontally extending louvres placed on the outer side is added to each air inlet;

which louvres each have a more or less sinusoidal sectional form with a length of one wavelength, and the tangents to the inlet zone and the outlet zone of each louvre are mutually parallel;

which louvres have mutual distances such that there are no lines of sight between the entry side and the exit side of the pattern of louvres; and the louvres have matte black surfaces;

such that light cannot reach the enthalpy exchanger panels from outside.

A pressure difference of a maximum of about 25 Pa is obtained with the stated form specifications for the inlet louvres. The above described enthalpy exchanger with the angular louvres which are disposed rheologically and optically in incorrect manner causes approximately a six-fold pressure loss, i.e. about 150 Pa. It must be remembered here that the smoothly rounded forms of the louvres provide for substantially undisturbed passage of the indrawn airflow.

According to the invention, it is deemed of great importance to ensure that the intake airflow passes the grids with louvres substantially undisturbed, certainly without causing vortices and turbulences. It is further deemed of great importance to ensure that the airflow entering the grids with the louvres has the same direction as the airflow exiting the grids with the louvres. In this respect the enthalpy exchanger according to the invention can have the special feature that the louvres are disposed such that the inlet zones and the outlet zones of the louvres extend in the direction of the airflow entering from outside.

A form of the airflows with a smooth progression which only deflects slightly in the area of the louvres is obtained with an embodiment wherein the ratio of the wavelength and the amplitude of the wave shapes amounts to a minimum of 3.

A preferred embodiment of the enthalpy exchanger according to the invention has the special feature that the enthalpy exchanger panels each have an angle of inclination in the range of 8°-30° relative to the median plane, and the air throughflow space has a form widening in the direction of the area of the fan.

The widening form of the air throughflow space appears to be contrary to the basic requirement according to the invention that the airflows in the air throughflow space converge at any position. It will however become apparent on the basis of the drawings to be described hereinbelow of a number of enthalpy exchangers according to the invention that the widening form of the air throughflow space ensures a stable convergent flow, which changes direction over a certain angle from the enthalpy exchanger panels to the fan.

According to a wholly different aspect of the invention, the enthalpy exchanger has the special feature that a screen through which at least some air can flow extends in the median plane, for instance a windbreak mesh of synthetic fabric of polyethylene (PE) monofilaments, or a metal gauze, particularly of stainless steel, with an openness of 30%-70%. A plastic screen can be constructed from monofilaments or ribbon yarn. An alternative is to use extremely tensively strong fibres, for instance reinforced polyethylene (Dyneema, a trademark of DSM).

With such a screen the sensitivity of the enthalpy exchanger to side winds is substantially reduced, and it can operate undisturbed in relatively high wind speeds.

The weight of prior art enthalpy exchangers is very high. Almost all parts are manufactured from steel and the parts are connected to each other by bolts with nuts and/or rivets.

The object of the invention, to provide an enthalpy exchanger which weighs considerably less than the known enthalpy exchangers, is realized partially with an embodiment of the enthalpy exchanger according to the invention, wherein the airflow-guiding element comprises a foam core and a jacket enclosing this core, is for instance embodied in integral foam with closed jacket or is embodied as the combination of the foam core and a metal, for instance aluminium or stainless steel, jacket enclosing this core; and the foam consists of plastic, for instance polyurethane or polyisocyanurate.

Any effect on the airflows in the air throughflow space is preferably prevented. According to the teaching of the invention, any obstacle to the airflow and any form which affects the airflow, resulting in dead zones, zones without suction, vortices and turbulences, are deemed undesirable. A contribution to the solution to this problem is made by an enthalpy exchanger according to the invention, which has the special feature that the drive means are located outside the airflows in the air throughflow space.

A number of the above described embodiments has the special feature that two identical and symmetrically arranged enthalpy exchanger panels, optionally in the form of identical assemblies of enthalpy exchanger panels, are disposed on either side of the median plane. It will be apparent that, in order to realize an optimal flow behaviour of the airflow drawn in by the fan, and thereby for practical reasons, this cannot always be realized, although this desire can be met in close approximation by the invention with an embodiment of the enthalpy exchanger according to the invention, wherein the enthalpy exchanger panels are disposed such that they define in a plane extending perpendicularly of the central axis of the fan a cross-sectional form which at least approximates the form of a polygon which is symmetrical relative to the median plane.

As described above, the downstream part of the airflow-guiding element, i.e. the part protruding freely outward from the fan over some distance, is of great importance for a good operation of the device according to the invention. The invention proposes in this respect an enthalpy exchanger of the described type, wherein the airflow-guiding element has in its downstream end zone a converging axial annular protrusion formed by mutually connecting surfaces, i.e. a concave inner surface and a substantially cylindrical or at least to some extent concave outer surface, these surfaces smoothly transposing on their sides remote from the protrusion into the locally at least approximately partly toroidal, convex remaining surfaces of the airflow-guiding element.

Realized hereby is a smooth and fully controlled flow on the outflow side of the fan with a bundling with limited spread, such that there need be no fear of a blown-out airflow being fed back and being sucked in once again via the air inlets.

A generally usual prior art enthalpy exchanger comprises approximately 7500 kg of steel, excluding the heavy fan and the associated drive means. Such a large mass of steel parts, including the plate metal housing, is necessary for the desired stiffness and mechanical strength. The invention proposes in this respect an enthalpy exchanger which comprises:

a housing consisting substantially of plastic, optionally with a fibre reinforcement, a sandwich construction with one or more foam plastic cores and jackets of plate metal, for instance aluminium or stainless steel, or integral foam which enclose the cores, comprising one or more foam plastic cores and jackets of this same plastic in solid form which enclose these cores.

The bottom plate is also deemed as being part of the housing.

A weight reduction in the order of a minimum of half the weight can be realized with such an enthalpy exchanger according to the invention. Recommended is the use of sandwich panels, for instance comprising a core of polyethylene foam with skin plates of fibre-reinforced polyethylene. The bottom can for instance be embodied as a double sandwich panel with a similar composition.

Using such a technique the enthalpy exchanger can be transported in a maximum of ten parts assembled in the factory so as to be assembled at the location of installation. In the described prior art enthalpy exchanger about 1500 parts have to be coupled to each other during installation.

It requires no further elucidation that sandwich panels of the described type have a very high internal vibration damping and are naturally rust-resistant.

A further very substantial weight reduction is realized with an embodiment of the enthalpy exchanger which has the special feature according to the invention that the medium application means comprise at least one supply container, for instance a water supply reservoir, placed above a relevant enthalpy exchanger panel, from which container medium is supplied at least partially under the influence of gravity to the upper side of the relevant enthalpy exchanger panels;

the medium collecting means comprise at least one collecting container which is placed under a relevant enthalpy exchanger panel, to which container unevaporated medium is supplied under the influence of gravity from the underside of the relevant enthalpy exchanger panels; and the supply container and the collecting container consist of plastic, optionally with a fibre reinforcement.

As already described above, an airflow-guiding element is added to the fan, preferably with an outward extending downstream streamlined shape which ensures that the blown-out airflow has a very controlled character with a small divergence. It is thereby prevented to a significant extent that air blown out by the fan is once again drawn into the air inlets.

In order to further improve this aspect and to guide the air entering the air inlet as effectively as possible, and to completely prevent undesired phenomena such as dead zones, zones without suction, vortices and turbulence, the invention proposes an enthalpy exchanger which has the special feature that added to the or each air inlet is an inlet frame comprising a number of edge parts connecting peripherally to each other relative to the air inlet; and the edge parts have streamlined shapes such that they guide the air entering the air inlet in effective manner and prevent air blown out by the fan being drawn once again into the air inlet.

An enthalpy exchanger is known with a number of fans, wherein a protective grid is added to each individual fan. The invention recommends an enthalpy exchanger comprising a protective grid covering the outflow opening of the fan or covering the outflow openings of all fans combined.

The invention further relates to an assembly of enthalpy exchangers which are each constructed according to the above stated specifications and are preferably identical, this assembly comprising:

at least one group of at least two enthalpy exchangers disposed relative to each other such that their median planes are coplanar and their air throughflow spaces are assembled into one combined air throughflow space.

The invention also relates to an assembly of the above described type, comprising:

at least one additional group of enthalpy exchangers with coplanar median planes and at least one second combined air throughflow space.

Described among other things in the foregoing is an enthalpy exchanger of a type in which the airflow is not deflected from two or more enthalpy exchangers disposed on either side of a median plane, but runs a more or less linear path from an enthalpy exchanger to a fan arranged roughly parallel thereto. Such an enthalpy exchanger complies with the specifications according to the invention in respect of, among other things, the form of the downstream part of the airflow-guiding element. The good operation thereof can be stimulated even further with an assembly of enthalpy exchangers, which comprises a number of windbreaks shielding the enthalpy exchanger panels, the air throughflow spaces and the fans from wind on all sides and having a combined form narrowing toward the area of the outflow zones of the fans, such that the windbreaks shield the air blown out by the fans from wind, such that this wind has only a negligible effect on the flow pattern of this air blown out by the fans, and the air inlets are left completely clear.

The invention further relates to an assembly of enthalpy exchangers, comprising at least two enthalpy exchangers disposed adjacently of each other, wherein the rotation directions of the rotors of adjacent fans are opposed to each other.

With such an assembly the mutually adjacent and optionally mutually overlapping areas of the airflows blown out by the relevant fans have the same direction. The risk of substantial vortices, vortex streets and turbulence occurring is hereby reduced very substantially relative to a usual arrangement, wherein the directions of the rotating components of the blown-out airflows are opposed in the described areas. This source of noise-like sound is thereby rendered harmless to at least a significant extent.

It is also possible according to the invention to upgrade an existing prior art enthalpy exchanger, which is afflicted by the many described drawbacks, and convert it into an enthalpy exchanger of the type according to the invention, which is considerably simpler, is lighter, consists of fewer parts, can be manufactured more cheaply, consumes less energy and has a considerably higher efficiency and brings about a very considerable reduction in sound emission. In this respect the invention also provides a method for converting an enthalpy exchanger for changing the enthalpy of a throughflow medium, for instance a cooling tower for cooling process water coming from an industrial process by means of passing air, which enthalpy exchanger comprises:

at least one air inlet;

at least one enthalpy exchanger panel connecting to each air inlet and configured to guide medium, such that during operation this medium exchanges enthalpy with airflows let through by the or each air inlet;

a combined air throughflow space connecting to all enthalpy exchanger panels;

such that air can only flow into the air throughflow space via the air inlets and the enthalpy exchanger panels;

a fan connecting to the air throughflow space and having a central axis, this also being the rotation axis of the rotor of the fan, which draws in and blows out air via the air inlets, the enthalpy exchanger panels and the air throughflow space; and electrical drive means added to the fan;

into an enthalpy exchanger according to the above described invention, which has the special feature that the ratio of the effective throughflow area of the fan and the total effective throughflow area of the relevant air inlets amounts to a maximum of about 0.3;

added to the fan is a rotation-symmetrical airflow-guiding element which extends both upstream relative to the fan, in the air throughflow space, and downstream relative to the fan, on the outer side of the enthalpy exchanger;

the airflow-guiding element has a streamlined shape in both its upstream zone and its downstream zone, such that dead zones are prevented; and the fan comprises a number of blades with free end zones which are mutually connected by a concentric ring which fits with some clearance into a correspondingly formed annular recess in the airflow-guiding element, such that the inner surfaces of the ring and the airflow-guiding element connect substantially smoothly to each other without appreciably interfering with the passing air;

this such that the airflows in the air throughflow space converge at any position and are partly for this reason substantially free of vortices, turbulences and areas without suction;

which method comprises the following steps of:

(a) adding to the fan a rotation-symmetrical airflow-guiding element which extends both upstream relative to the fan, in the air throughflow space, and downstream relative to the fan, on the outer side of the enthalpy exchanger;

(b) replacing the fan with a fan comprising a number of aerodynamically formed blades arranged in angularly equidistant manner on a coaxially placed hub and with outer end zones which are mutually connected by a concentric ring which fits with some clearance into a correspondingly formed annular recess in the airflow-guiding element, such that the inner surfaces of the ring and the airflow-guiding element connect substantially smoothly to each other without appreciably affecting the passing air.

It should be understood that performing an upgrade operation on the basis of the above described method can also be supplemented with additional upgrade steps which can be performed on the basis of the above stated specification, which is partly based on the appended claims.

BRIEF DESCRIPTION OF THE DRAWINGS

The invention will now be elucidated with reference to the accompanying drawings. In the drawings:

FIG. 1 shows a side view of a prior art four-fold enthalpy exchanger;

FIG. 2 shows a front view of the enthalpy exchanger according to FIG. 1;

FIG. 6 shows a view corresponding with FIG. 3 of the enthalpy exchanger according to the invention according to FIGS. 4 and 5;

FIG. 7 shows a fixing element for mounting an advanced fan in the embodiment according to FIGS. 4, 5 and 6;

FIG. 11A shows the cross-section according to FIG. 11 on smaller scale, and drawn adjacently:

FIG. 11A' the flow velocity distribution of the supply airflow of the enthalpy exchanger;

FIG. 11A" the flow velocity distribution in the upstream area of the fan;

FIG. 11A''' the flow velocity distribution on the downstream side of the fan;

FIG. 12A shows a view corresponding with FIG. 11A' of the supply flow velocity distribution of the enthalpy exchanger according to FIG. 12;

FIG. 23 shows a top view corresponding with FIG. 20 of a variant with a centrally disposed drive;

FIG. 27 shows the cross-section XXVII-XXVII of FIG. 26;

FIG. 28 shows the cross-section XXVIII-XXVIII of FIG. 26;

FIG. 32 shows a perspective view of the enthalpy exchanger according to FIGS. 30 and 31 with a schematically designated control for correct positioning of the enthalpy exchanger relative to the prevailing wind;

FIG. 33A shows the embodiment according to FIG. 33 on smaller scale, with adjacently thereof:

FIG. 33A' the flow velocity distribution of the supplied airflow of the enthalpy exchanger;

FIG. 33A" the flow velocity distribution in the upstream area of the fan;

FIG. 33A''' the flow velocity distribution on the downstream side of the fan;

DETAILED DESCRIPTION

Figure 3:
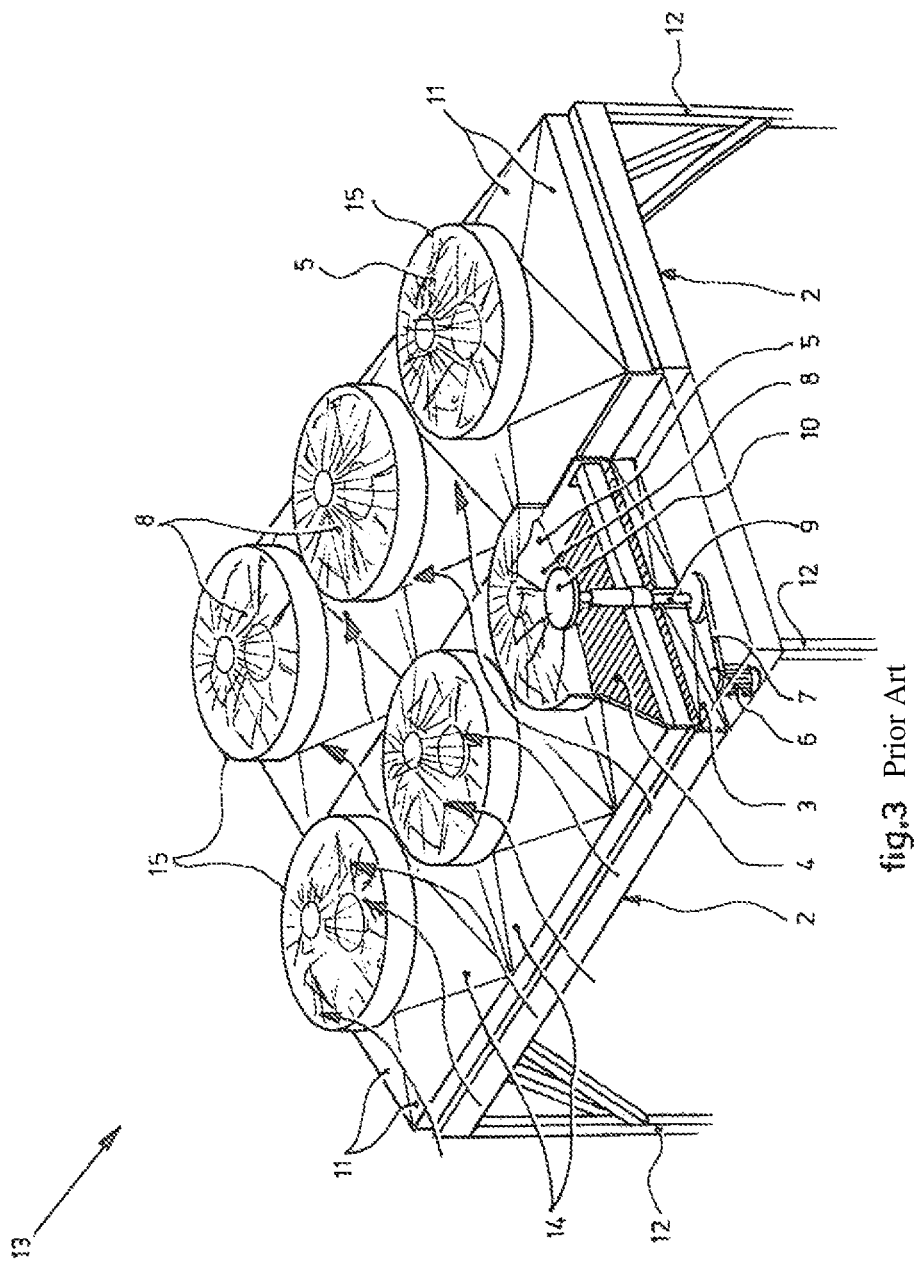
FIG. 3 shows a partially cut-away perspective view at an angle from above of a six-fold enthalpy exchanger, similar to the enthalpy exchanger according to FIGS. 1 and 2.

FIG. 1 shows a prior art four-fold enthalpy exchanger. Enthalpy exchanger 1 comprises two air inlets 2 disposed adjacently of each other, two enthalpy exchanger panels 3 connecting to each air inlet 2, two air throughflow spaces 4 connecting to enthalpy exchanger panels 3, four fans 5 connecting to the air throughflow spaces 4 in pairs and having a vertical axis which also forms the rotation axis of the fan rotors 8 (drawn with broken lines), as well as four electrical drive means added to each fan 5 and comprising an electric motor 6 and a transmission 7 for transmitting the rotation generated by the electric motor to fan rotor 8, via a vertical drive shaft 9 (see FIG. 3) and to the central rotor hub 10 forming part of rotor 8.

Air throughflow spaces 4 are defined by plate metal elements 11 which are mutually connected and together define a form narrowing in upward direction. The plate metal elements consist of steel plate with a thickness in the order of 4-5 mm and have a weight in the order of 900 kg. The plate metal elements can form part in groups of one combined metal plate which is modelled into the shown form by a punching and bending operation, while leaving open round through-holes for accommodating fans 5.

The enthalpy exchanger panels 3 are supported by support legs 12 and in turn support the plate metal elements 11 which define air throughflow space 4, and fans 5, electric motors 6 and transmissions 7.

FIG. 3 shows in a six-fold variant of the four-fold enthalpy exchangers according to FIGS. 1 and 2 a six-fold enthalpy exchanger 13, wherein one of the units 14 is drawn partially cut-away for the sake of clarity. This shows clearly that the air throughflow spaces 4 in the area under each fan 5 have a form narrowing toward the top. It is also clear that air inlets 2 have angular, non-rounded forms, as do the cylindrical outflow guides 15, which have for their object to give the airflow emitted by the relevant fan 5 the calmest and most controlled possible character.

As a result of this angular, non-rounded form with abrupt transitions, both on the inlet side and the outlet side of the enthalpy exchangers, the air in air throughflow spaces 4 cannot be prevented from having a chaotic and completely unpredictable character. Nor can the intake airflow in the area of air inlets 2 under fans 5 be prevented from concentrating mainly in the central zone under fan hubs 10. As a result of the described structure the airflow flowing through the air throughflow space from the exit side of the relevant enthalpy exchanger panel will extend mainly from the central zone to the fan and will have a more or less divergent form. This is caused partly by the fact that there are dead zones in air throughflow space 4 due to the non-rounded and angular forms with abrupt transitions, which zones result in the flow opting for the free central area. This is however also problematic because a strong so-called pre-rotation of the airflow will occur in the air throughflow space. In combination with the dead zones and the vortices in the transition zones between the enthalpy exchanger panels and plate metal elements 11 an unstable and unpredictable flow occurs in the air throughflow space. In order to nevertheless achieve a reasonable output, drive motors 6 of fans 5 have to produce a relatively high power in order to still bring about some enthalpy exchange.

The turbulence and the chaotic flow patterns in air throughflow space 4 further cause a strong noise-like sound. It must also be borne in mind here that sound production naturally entails energy loss.

In respect of the dimensioning of devices 1 and 13 according to respectively FIGS. 1 and 2 and FIG. 3 it is also noted that the fans have a diameter in the order of magnitude of 3 m.

A round protective grid 16 is added to each fan on the discharge side.

It is also noted with reference to FIG. 3 that completely uncontrolled airflows occur above the upper surface of plate metal elements 11 and in the areas between fans 5. These likewise cause energy loss and noise nuisance.

Figure 5:
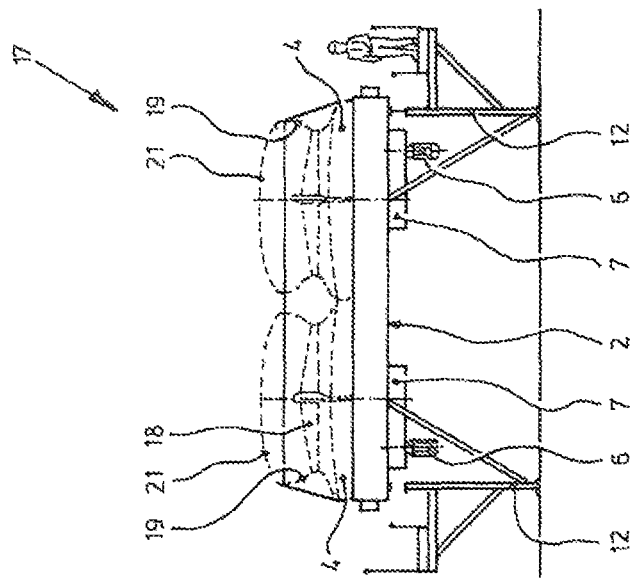
FIGS. 4 and 5 show views corresponding with FIGS. 1 and 2 of a multiple enthalpy exchanger according to the invention.
Figure 4:
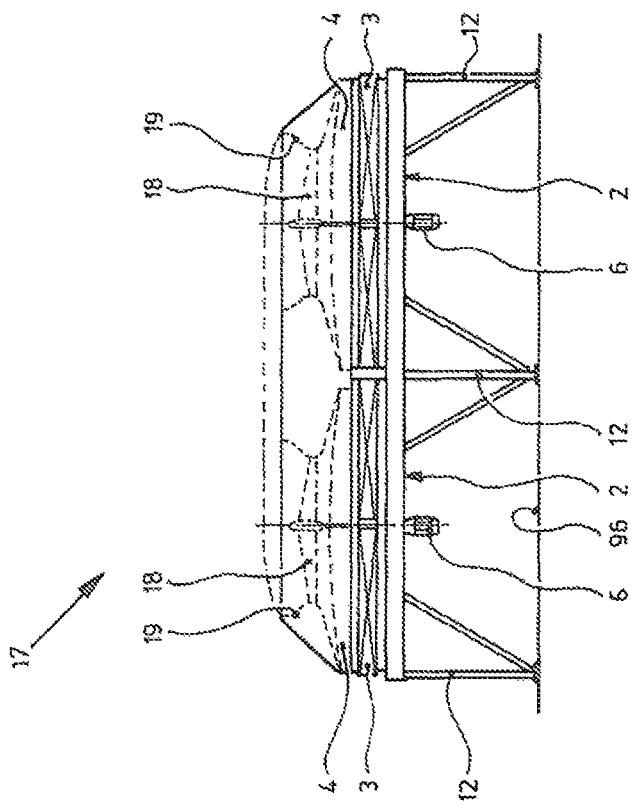

FIGS. 4 and 5 show four-fold enthalpy exchangers 17 which are constructed according to the invention such that the described prior art drawbacks according to FIGS. 1, 2 and 3 do not occur, or at least do so to substantially lesser extent.

Added to each fan 18, which is of a completely different type, to be described hereinbelow, than prior art fan 5, is a rotation-symmetrical airflow-guiding element 19 which has a streamlined shape on both the upstream side of the fan and the downstream side of the fan such that the airflows upstream and downstream relative to the fans have a substantially calmer and more predictable character than the described airflows in the prior art structures.

As a result of the drawn forms of the airflow-guiding element which extend more or less in the form of a funnel in upward and downward direction from the fan, the inlet flow in the area of the relevant air inlets 2 and the flow through each enthalpy exchanger panel also have a substantially calmer and more predictable progression, wherein it should also be noted that the airflow flows through the whole surface of the relevant enthalpy exchanger panels.

FIGS. 4 and 5 show clearly the form, which narrows in upward direction in the direction of the fan, of the part of guiding element 19 lying upstream relative to fan 18, whereby the airflow has a convergent character in the area of air throughflow space 4. The dimensioning is chosen such that the ratio of the effective throughflow area of the fan and the total effective throughflow area of the relevant air inlet amounts to a maximum of about 0.3, in accordance with the teaching of the invention. As a result of this convergence the airflow flowing through the space in question is also convergent, and as a result thereof inherently stable and predictable, wherein the shown forms guarantee that there can be no dead zones, nor can structural vortices, vortex streets with vortices varying over time or turbulences occur.

The airflow-guiding element also has a part lying downstream relative to the fan and extending on the outer side, above fan 18, in the manner clearly shown in FIGS. 4 and 5. This downstream part of guiding element 19 also has a suitable streamlined shape, whereby vortices and turbulences are also largely prevented in the outflowing air.

Fans 18 are of a very advanced and refined type. They each comprise a number of, preferably at least ten, aerodynamically formed blades arranged in angularly equidistant manner on a coaxially placed hub and with outer end zones which are mutually connected by a concentric ring which fits with some clearance into a correspondingly formed annular recess in the airflow-guiding element, such that the inner surfaces of the ring and the airflow-guiding element connect substantially smoothly to each other without appreciably affecting the airflow through the fan. In FIGS. 4, 5 and 6 fans 18 are only shown schematically. The fan of the described type according to the invention will be discussed in more detail below with reference to the drawings of diverse enthalpy exchangers according to the invention, starting with FIG. 15. Other than in device 1 according to FIGS. 1 and 2 and device 13 according to FIG. 3, a number of windbreaks shielding the enthalpy exchanger panels 3, the air throughflow spaces 4 and fans 18 from wind on all sides and having a combined form narrowing toward the area of the outflow zones of fans 18 is arranged on the enthalpy exchanger, such that the windbreaks shield the air blown out by the fans 18 from wind, whereby this wind has only a negligible effect on the flow pattern of this air blown out by fans 18, wherein air inlets 2 are left completely clear.

In prior art devices 1 and 13 a protective grid is arranged on each fan on the outflow side.

In enthalpy exchangers 17 according to FIGS. 4 and 5 the two groups of two fans are each covered by a protective grid 21 covering the outflow openings of these two fans in groups. FIG. 6 shows a six-fold variant, i.e. an enthalpy exchanger 20 which, just as prior art enthalpy exchanger 13, comprises two groups of fans disposed in respective parallel rows. In this six-fold embodiment the enthalpy exchanger 20 also comprises two protective grids 21 covering the outflow openings of the two groups of three fans in groups.

In respect of devices 17 and 20 it is also noted that it is possible to consider giving adjoining fans 18 opposite rotation directions. A source of vortices in the boundary areas and transition areas between the blown-out airflows is thereby eliminated or at least substantially reduced.

Added to each of the fans 18 is a rotation-symmetrical outlet diffuser with a streamlined shape which corresponds to the inner form of the airflow-guiding element on the outflow side of fan 18 shown in FIGS. 4 and 5. The actual embodiment of the airflow-guiding element 19 will be shown and described in more detail below, with reference to FIG. 15 and following.

FIG. 7 shows a fixing element 22 for mounting an advanced fan 18 in the embodiment according to FIGS. 4, 5 and 6.

The element comprises four upright edge parts 23 with curved upper edges 24, a square, likewise metal, plate 27 connected airtightly thereto by means of a welding device 25 while pressing down as according to arrow 26 and having a through-hole 28 for accommodating fan 18, and a rotation-symmetrical structure 29 connected to plate 27 for supporting fan 18. The structure comprises an outer casing 30 consisting of bent strips which are coupled to each other with their complementary end zones, designated with 31.

As noted above, the fan has an effective diameter in the order of magnitude of 3 m.

Edge parts 23 each have a length of about 4 m.

It is noted that the form of the fixing element need not necessarily be square. Slightly elongate forms differing from a square form can also be used in some circumstances.

Figure 8:
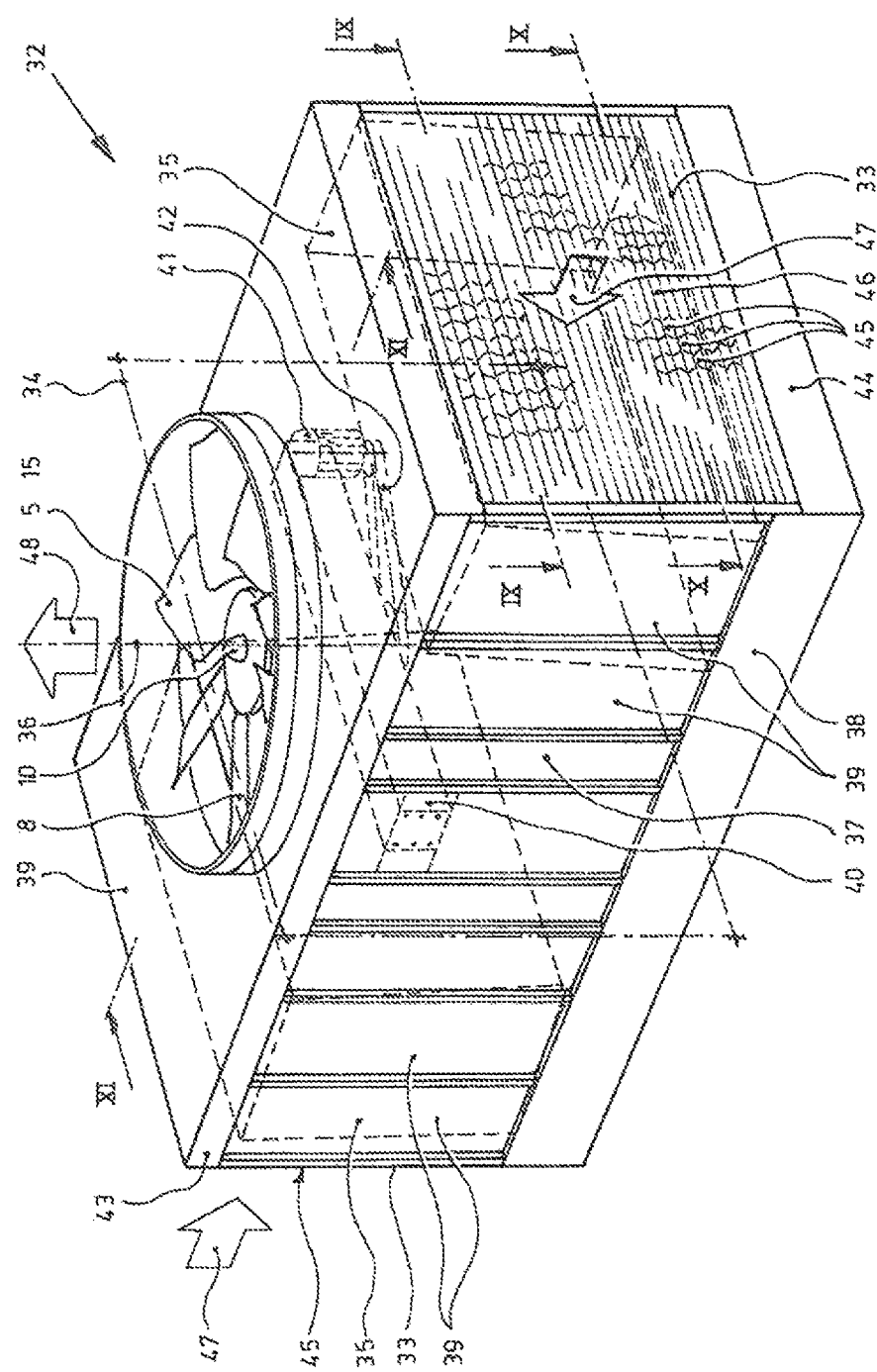
FIG. 8 shows a partially cut-away perspective view of a double-sided enthalpy exchanger embodied as prior art wet cooler.

FIG. 8 shows a prior art double-sided enthalpy exchanger 32 from the manufacturer Baltimore.

Two air inlets, both designated with 33, are disposed in this enthalpy exchanger 32 on either side of a median plane 34 defined in the enthalpy exchanger. Two enthalpy exchanger panels 35 are disposed symmetrically relative to the median plane 34. Central axis 36 of fan 5 extends in vertical direction in median plane 34. Fan 5 is disposed symmetrically relative to median plane 34.

The diameter of the fan is about 3 m, while the motor power used lies in the order of 35 kW.

Enthalpy exchanger panels 35 have a slightly inclining position, such that their mutual distance increases in the direction of fan 5, i.e. in upward direction.

Defined between enthalpy exchanger panels 35 and fan 5 is an air throughflow space 37 which is bounded by steel plates forming part of a frame 38 and all designated with 39.

Fan 5 is supported by a support beam 40 forming part of frame 38 and also supporting the electric drive motor 41 and transmission 42 from the electric motor to fan 5.

Because fan 5 with its drive 41, 42 is supported by frame 38 via frame support beam 40, it cannot be prevented that steel plates 39, which form the housing of enthalpy exchanger 32 and form part of frame 38, are excited by the thus created heavy mechanical vibrations. Due to the large dimensions of these plates they have a high acoustic load and they will cause a very substantial sound emission. This sound emission by frame plates 39 comprises frequencies which are associated with the speed of revolution of rotor 8 of fan 5, the number of rotor blades and the rotation speed of electric motor 41.

In addition, the airflows through enthalpy exchanger 32 are extremely unfavourable, and these airflows thereby contribute greatly to the sound emitted by enthalpy exchanger 32.

Enthalpy exchanger panels 35 comprise plates, particularly of PVC, which are disposed in mutually parallel relation and vertically equidistant and are to be wetted, to be described below, which receive water from water supply reservoir 43 which is disposed on the upper side of enthalpy exchanger 32 and dispenses water along the enthalpy exchanger elements of panels 35 via openings and optionally sprayers, following which the unevaporated water leaks downward into a water collecting reservoir 44 disposed on the lower side of enthalpy exchanger 32.

Inlet openings 45 on the entry side of enthalpy exchanger panels 35 are covered by inlet grids 46. The nature, the form and the function thereof will be described and elucidated below, particularly with reference to FIG. 11.

Arrows 47 designate the feed airflow which is drawn in via air inlets 33 and inlet openings 45. After passing through air throughflow space 37 the air leaves enthalpy exchanger 32 via the fan. The outlet airflow is designated with an arrow 48.

Figure 9:
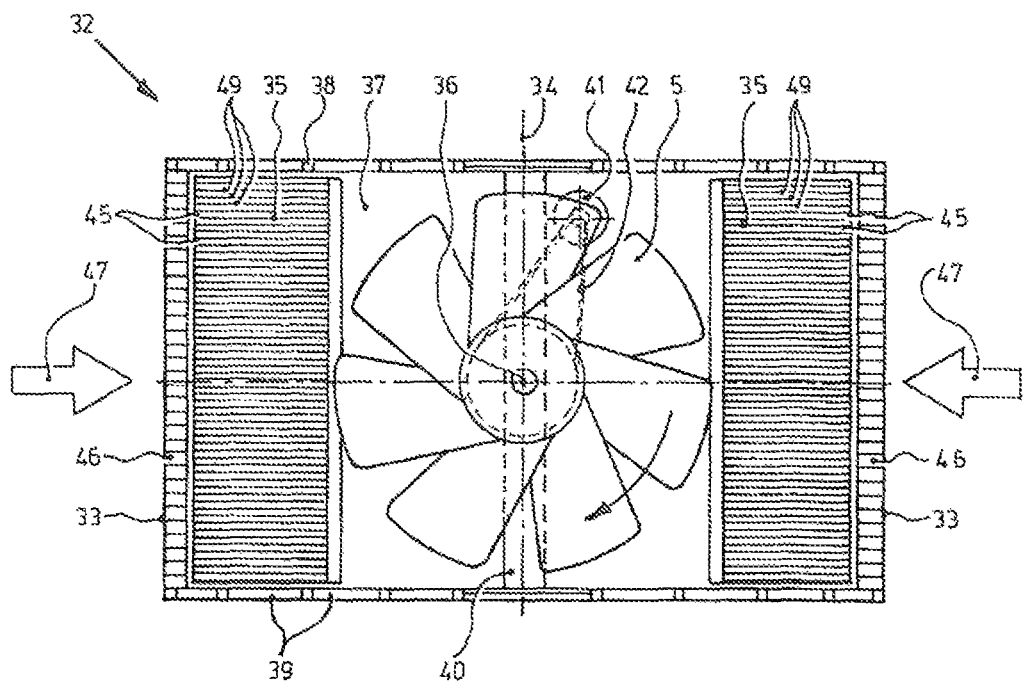
FIG. 9 shows the horizontal section IX-IX of FIG. 8.

FIG. 9 shows the horizontal cross-section IX-IX of FIG. 8. FIG. 9 shows that the enthalpy exchanger panels comprise a number of PVC plates which are disposed adjacently of each other in vertical position and are wetted in the described manner, whereby the temperature of the water for wetting decreases in the manner of an evaporation cooler because part thereof evaporates as a result of the air flowing between PVC plates 49, which provides for partial evaporation of the water film in question.

Figure 10:
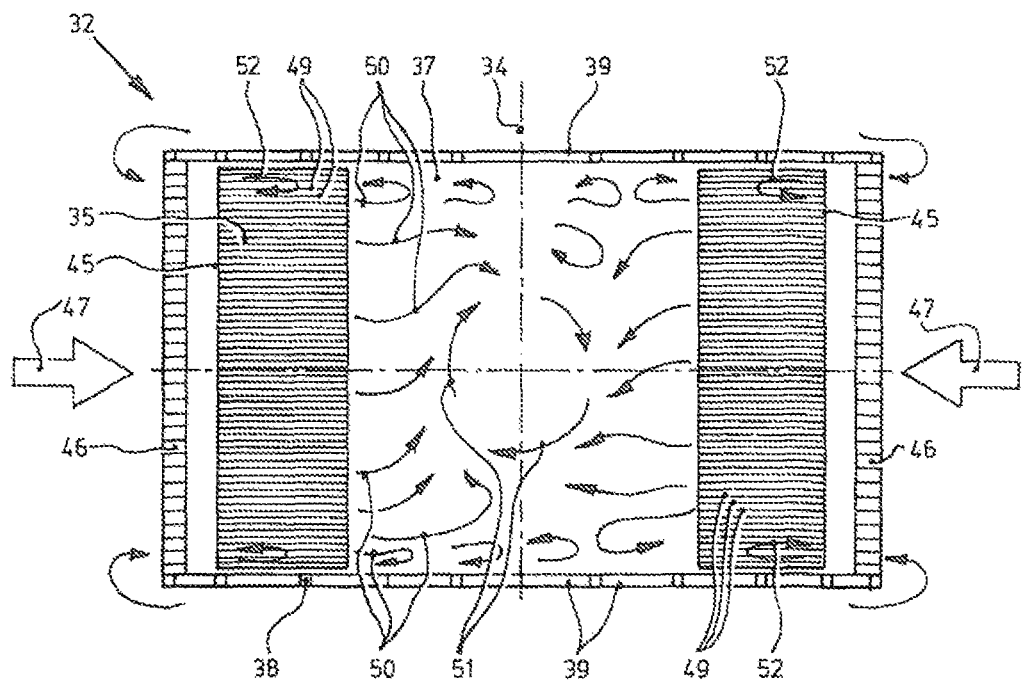
FIG. 10 shows the horizontal section X-X of FIG. 8.

FIG. 10 is the horizontal section X-X of FIG. 8. This figure is particularly important because the completely chaotic flows in air throughflow space 37 are designated very schematically with arrows 50. This figure elucidates that the occurrence of dead zones, vortices greatly varying over time and turbulence cannot be prevented as a result of the angular forms and abrupt transitions. A strong pre-rotation occurs in the central area of the air throughflow chamber as a result of the complete lack of technical refinement of fan 5. The relevant arrows are designated with reference numeral 51.

It is not even possible to prevent the direction of the indrawn air reversing locally in the space between two adjacent PVC plates, particularly in the side zones of enthalpy exchanger panels 35. No effective suction by fan 5 takes place in such zones. The relevant part-flows with reversing direction are designated with arrows 52.

It will be apparent that FIG. 10, which provides an accurate image of the flows in air throughflow space 37, demonstrates that these airflows have a completely chaotic and uncontrolled character. The fan with its drive is in practice overdimensioned such that an acceptable output nevertheless remains.

Figure 11:
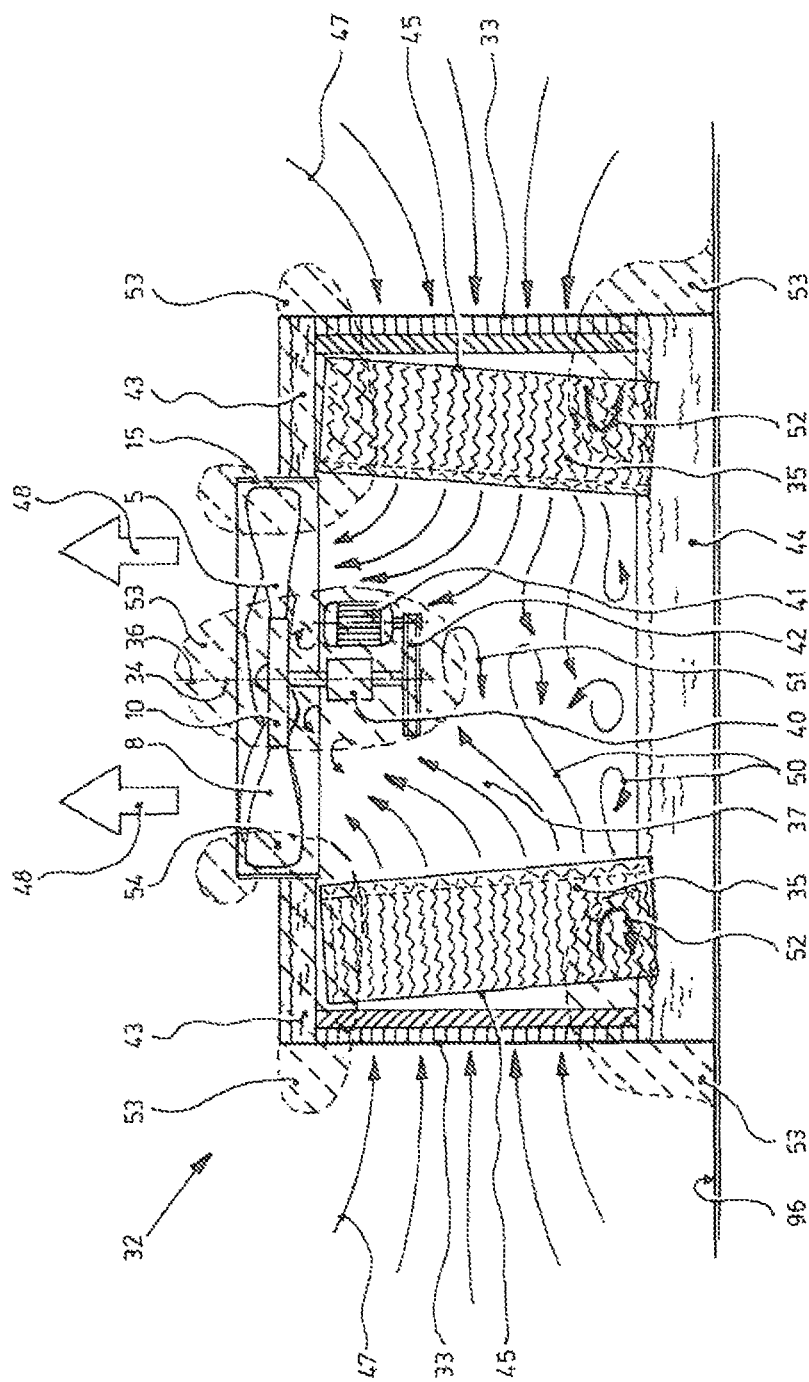
FIG. 11 shows the vertical section XI-XI of FIG. 8.

FIG. 11 shows the vertical section XI-XI of FIG. 8.

It is also apparent in the view according to FIG. 11 that only a small part of the airflow let through by the enthalpy exchanger panels reaches the fan unimpeded. In the plane of the drawing this is largely no more than about 40% of the overall height of enthalpy exchanger panels 35. It is noted that prior art enthalpy exchanger 32 is greatly afflicted by an extremely disadvantageous phenomenon, i.e. the occurrence of relatively large, extensive zones where no suction occurs, even in the case in which the fan is operated with high drive power and at a high rotation speed. These zones without suction are designated in all figures in which they are relevant with contours of broken lines, which contours are filled with hatching, likewise of broken lines. These zones without suction are designated with reference numeral 53. It can be derived from the zones without suction 53 in the area of enthalpy exchanger panels 35 that the effective throughflow part amounts to only about 40% of the total effectively available area.

It is important to note that the zones without suction 53 are located both inside and outside enthalpy exchanger 32. In the areas located outside exchanger 32 effective flow does not take place through the area in question, which has a very adverse effect on the performance of enthalpy exchanger 32.

Attention is duly drawn to the fact that, due to the aerodynamically highly inadequate construction of the fan and the cylindrical outflow guide 15, substantial zones without suction also occur in the area of the fan. This is the area of the free end zones of blades 54 of rotor 8 of fan 5, as well as the central part in the area of the central hub 10 extending over a substantial diameter of the rotor.

On the basis of the foregoing it will be apparent that the flow pattern and thereby the effective enthalpy-exchanging performance of prior art enthalpy exchanger 32 leaves a lot to be desired.

An inlet grid 46 is added to each of the two inlet openings 45. This grid comprises a number of horizontally extending louvres 60 disposed with equal mutual distances and with a cross-sectional form which is clearly shown in FIG. 11. On the upstream side the surfaces of louvres 60 extend horizontally, followed by a part directed downward through an angle of about 45°, whereby the feed airflow is deflected downward and then at least partly supplied to the relevant enthalpy exchanger panel 35.

In full accordance with the above described angular, unstreamlined structure of enthalpy exchanger 32, which has the described great drawbacks, it will be apparent that the feed airflows will also be guided in a particularly peculiar manner if louvres 60 according to this prior art are used. It must be understood that it is an important object of the louvres to shield the wetted PVC plates 49 from outside light, particularly direct sunlight. The object of the louvres according to this prior art is therefore probably to ensure such a shielding. It is highly questionable whether this object is realized to sufficient extent, since it can be assumed that there are lines of view from outside to inside in most cases, i.e. that the PVC plates of the enthalpy exchanger panels are visible from outside via relatively narrow gaps through inlet grids 46.

An even more significant drawback lies in the rheologically very technically unrefined and angular form and arrangement of louvres 60. It will be evident that the airflow leaving louvres 60 has to be directed transversely of the infeed surface of the relevant enthalpy exchanger panel as far as possible. In the drawn prior art embodiment the airflow is now conversely deflected downward through an angle of 45°. The adverse effect of the incorrect inflow angle into the enthalpy exchanger panels 35 is intensified further by the fact that these panels 35 are disposed inclining at an angle of about 5° relative to a vertical plane. The angle of incidence of the relevant airflow on the entry side of each enthalpy exchanger panel 35 is thereby no less than 50°. This is an inexplicable choice which partly results in a dead zone being created on the upper side, while there is an area on the underside with completely incorrect approach flow where the previously described local flows 52 with reversing direction therefore occur.

FIG. 11A shows the enthalpy exchanger 32 according to FIG. 11 on a smaller scale. Three graphs are added to this FIG. 11A, namely FIG. 11A', FIG. 11A" and FIG. 11A'''.

FIG. 11A' shows the distribution of the flow velocity of feed airflow 47. The graph corresponds precisely to the dimensions of the relevant inflow side of enthalpy exchanger 32. FIG. 11A' clearly shows that the flow concentrates in the central area, even slightly above the centre, and that the flow velocity first goes to zero toward the edges and reaches negative values, thus the direction thereof reverses, further upward and further downward.

FIG. 11A" shows a similar speed distribution roughly halfway along the height of enthalpy exchanger 32. The figure is symmetrical relative to median plane 34. This is why only the left part has been drawn.

FIG. 11A''' shows the distribution of the speed of outlet airflow 48. Just as the distribution according to FIG. 11A", this distribution is also symmetrical relative to median plane 34, even roughly relative to rotation axis 36 of fan 5. This is why only the part furthest to the left has been drawn. It will be apparent that only a very limited part of the available outflow area of the fan is utilized effectively.

The in principle rotation-symmetrical flow pattern of the diverging free blown-out outlet airflow 48 is on the right-hand side likewise drawn on only one side. The airflow has at boundaries 55 thereof strong vortex streets 56 varying over time. The chaotic airflows 50 in air throughflow space 37, the strong pre-rotation, the vortices and turbulences cause a strong noise-like sound.

Figure 12:
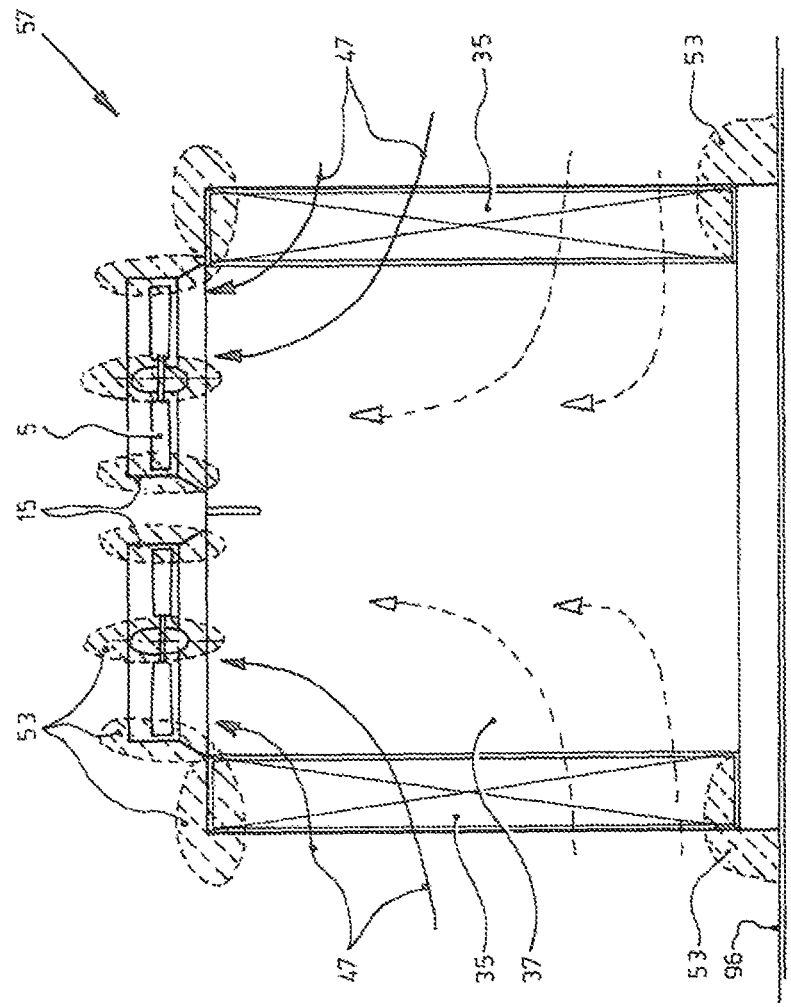
FIG. 12 shows a view corresponding with FIG. 11 of another prior art enthalpy exchanger.
Figure 12:
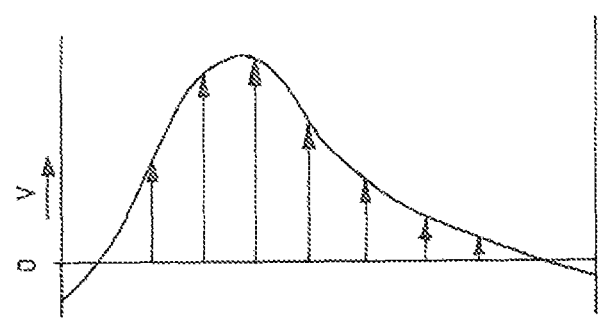

FIG. 12 shows another prior art enthalpy exchanger 57. This comprises two upright enthalpy exchanger panels 35 of the dry type, i.e. for instance heat exchanger panels with tubes and slats, through which tubes flows medium to be cooled by the throughflow air.

Other than enthalpy exchanger 32, this enthalpy exchanger 57 comprises two smaller fans having in principle the same structure as fan 5 according to the above described and shown exemplary embodiments. The zones without suction are here also shown with broken contour lines and hatching, and designated with reference numeral 53.

FIG. 12A shows the supply flow velocity distribution of enthalpy exchanger 57. The effectiveness of the inflow also leaves a lot to be desired in this embodiment, as will be apparent on the basis of the graphically shown speed distribution. It can be assumed that the feed airflows effectively flow through only about 40% of the height of enthalpy exchanger panels 35.

Figure 13:
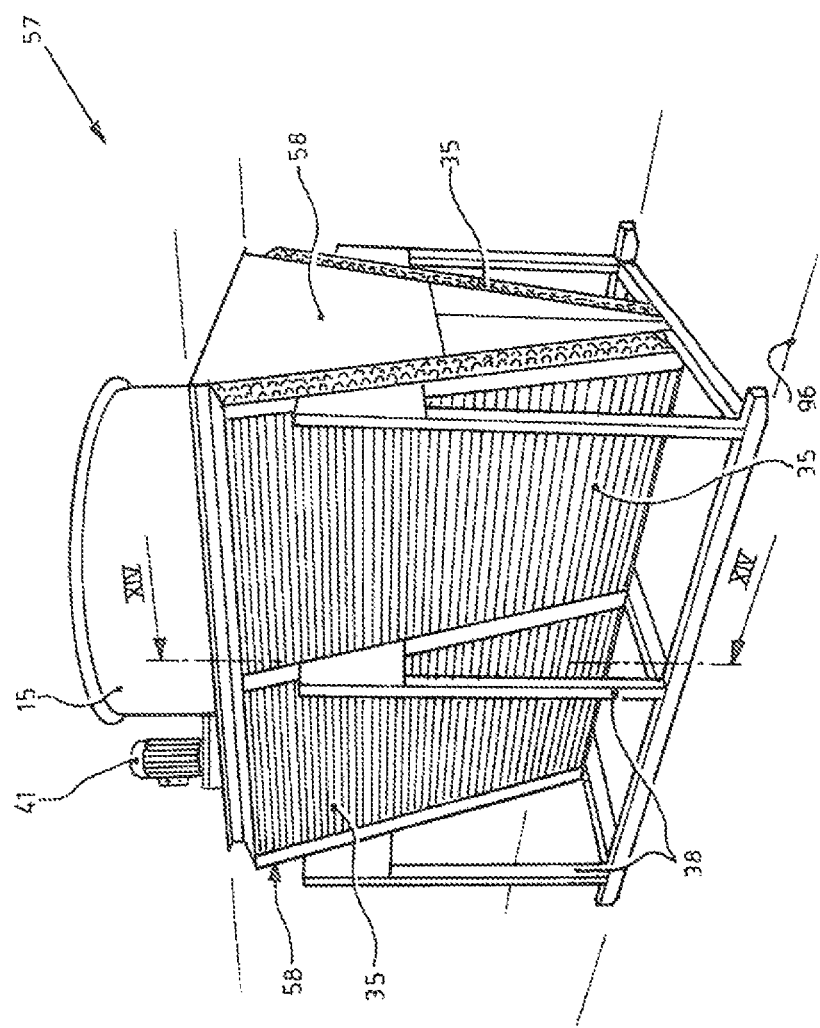
FIG. 13 shows a perspective view of yet another prior art enthalpy exchanger.

FIG. 13 shows yet another prior art enthalpy exchanger 57.

The enthalpy exchanger panels 35 which are disposed in a general V-shaped cross-sectional position enclose together with two end walls 58 and an upper plate 63 the air throughflow space 37. Enthalpy exchanger panels 35 are disposed at an incline at angles of about 20° with the vertical plane, and comprise per se generally known and usual heat exchanger plates with copper tube parts extending in a zig-zag pattern and mutually connected in series, and thermally conductive slats or fins coupled to these tube parts for enlarging the heat-exchanging surface area.

Figure 14:
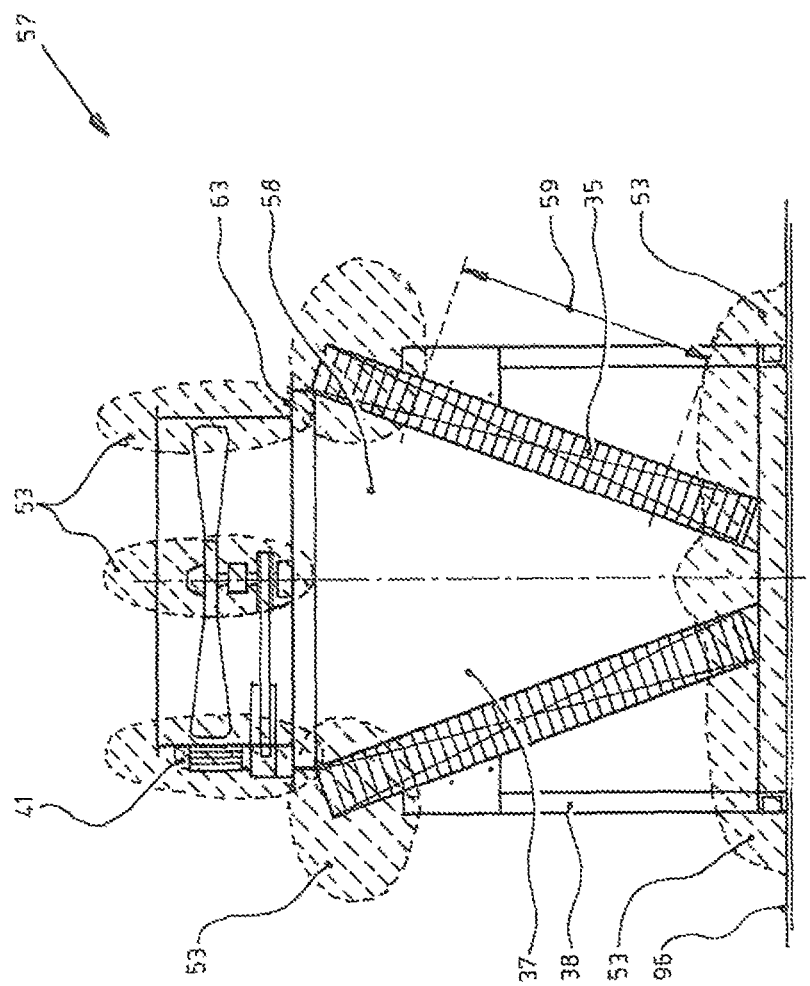
FIG. 14 shows the cross-section XIV-XIV of FIG. 13.

FIG. 14 shows the vertical cross-section XIV-XIV of FIG. 13. The zones without suction, which are once again designated with reference numeral 53, show that the effectiveness of the air throughflow is also very limited in this embodiment. It is schematically shown with an arrow 59 that in this embodiment approximately half the height of enthalpy exchanger panels 35 is effective for letting through air.

Figure 15:
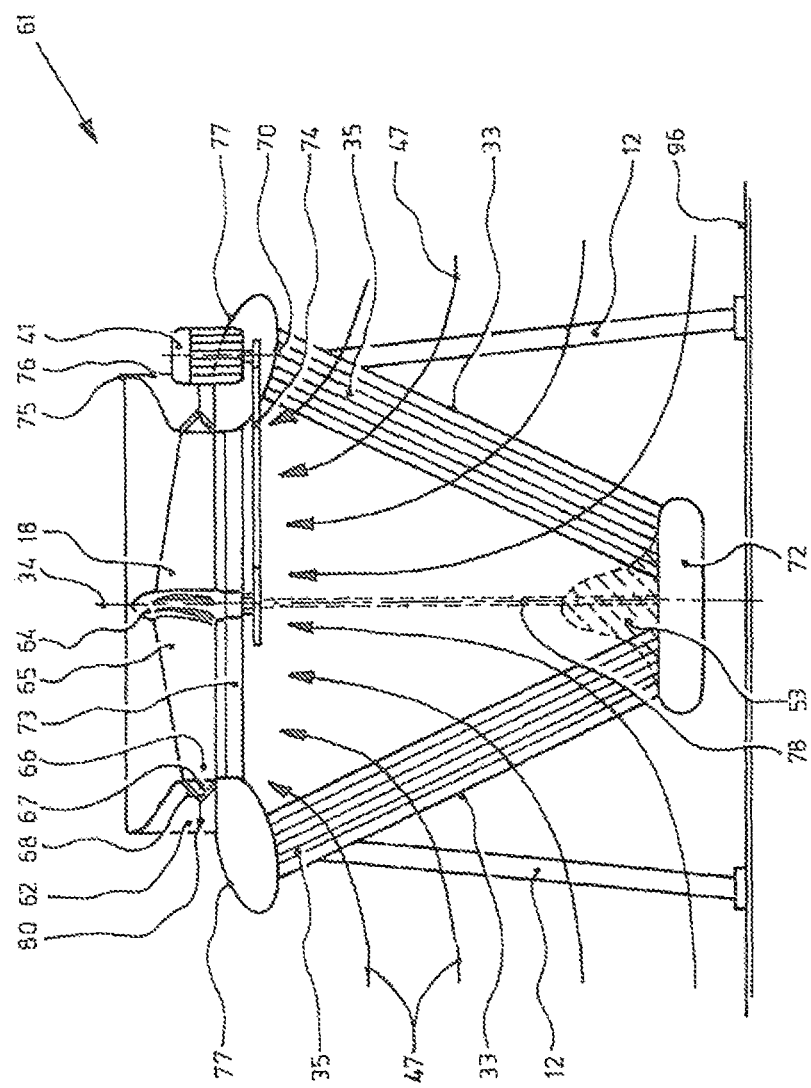
FIG. 15 shows a view corresponding with FIG. 14 of an advanced enthalpy exchanger according to the invention in a first exemplary embodiment.

FIG. 15 shows an enthalpy exchanger of the double type according to the teaching of the invention. This enthalpy exchanger is designated with reference numeral 61.

Enthalpy exchanger 61 comprises two enthalpy exchanger panels 35 disposed at angles of about 25° relative to the vertical plane. As a result of this oblique arrangement of enthalpy exchanger panels 35 the air throughflow space has a form diverging more strongly in upward direction than for instance prior art enthalpy exchanger 32 as drawn in FIG. 11.

A number of aspects of the invention can be recognized in enthalpy exchanger 61.

The ratio of the effective throughflow area of the advanced fan 18 according to the invention to be described below and the total effective throughflow area of the relevant air inlets 33 amounts to a maximum of about 0.3. Added to fan 18 is a rotation-symmetrical airflow-guiding element 62, of which at least the form of the inner surface is also recognizable in the cut-away part of enthalpy exchanger 20 in FIG. 6. Airflow-guiding element 62 extends both upstream relative to fan 18, thus over some distance in air throughflow space 37, and downstream relative to fan 18, thus on the outer side of enthalpy exchanger 61.

The rotation-symmetrical airflow-guiding element 62 which is added to the fan and co-acts therewith in a manner to be described below, and extends as described both upstream and downstream relative to fan 18, has in both its upstream zone and its downstream zone a streamlined shape which results in dead zones, vortices and turbulences effectively being prevented in the upstream area, particularly in the area of the upper side of the enthalpy exchanger panels, and likewise on the outflow side. Fan 18 comprises a number of, preferably at least ten, aerodynamically formed blades 65 arranged in angularly equidistant manner on a coaxially placed hub 64 and with outer end zones 66 which are mutually connected by a concentric ring 67 which fits with some clearance into a correspondingly formed annular recess 68 in the airflow-guiding element 62, such that the inner surfaces of ring 67 and airflow-guiding element 62, designated with respective reference numerals 69 and 70, connect substantially smoothly to each other without appreciably affecting the airflow through fan 18.

As FIG. 15 shows, the radial section of ring 67 has the general shape of a triangle. The radial section of annular recess 68 has practically the same shape. Ring 67 thus fits with small clearance into annular recess 68. Because the distance between the inner surface of ring 67 and the inner surface of airflow-guiding element 62 is so small on both axial sides, the passing air is not affected to any appreciable extent, partly owing to the smoothly connecting form of these inner surfaces.

In enthalpy exchanger 61 the airflows in the air throughflow space are not adversely affected by sharp transitions, obstacles and the like. Throughflow thereby takes place over practically the whole height of enthalpy exchanger panels 35. This has the result, in combination with the described streamlined shape of the airflow-guiding element 62, that the ratio of the effective throughflow area of fan 18 and the total effective throughflow area of the relevant air inlets, in this case twice the surface area of each individual enthalpy exchanger panel 35, amounts to a maximum of about 0.3.

With the combination of these described measures it is achieved that the airflows in the air throughflow space converge at any position and are essentially free of dead zones, vortices, vortex streets varying over time, turbulences and areas without suction, other than is the case in the prior art enthalpy exchangers, as described in the foregoing.

Enthalpy exchanger 61 is of the dry type. Enthalpy exchanger panels 35 are usual heat exchanger panels on the basis of tubes through which medium to be cooled flows and which are provided on their outer sides with area-enlarging, thermally conductive fins or slats. The throughflow medium is thus cooled by the airflows 47 flowing through panels 35.

Figure 16:
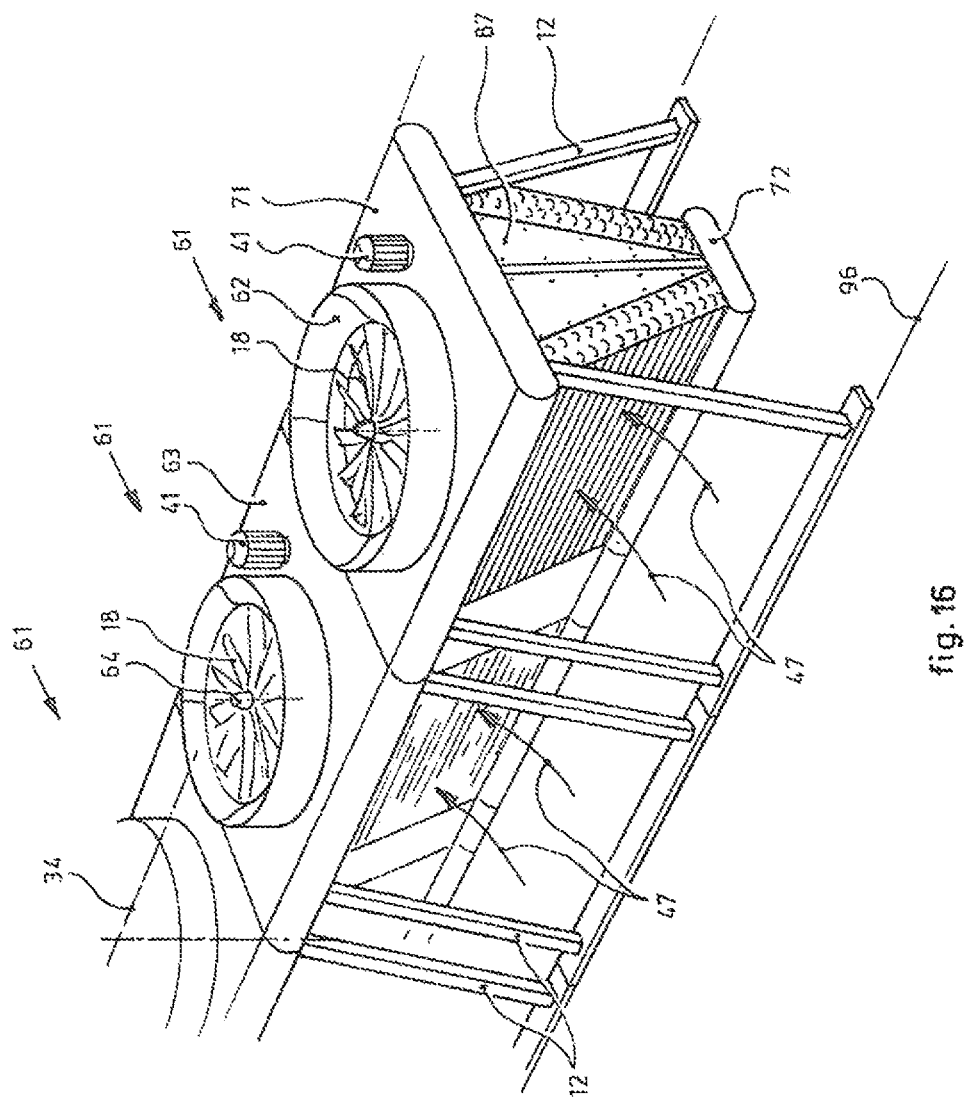
FIG. 16 shows a perspective view of a part of an arrangement in a row of a number of enthalpy exchangers according to FIG. 15.

As FIG. 15 shows, the rotation-symmetrical airflow-guiding element 62 connects to a prismatic additional streamlined element extending according to FIG. 16 in the direction of the median plane 34 and with an inner surface which is a continuation of inner surface 70 of airflow-guiding element 62. The panel 71 clearly shown in FIG. 16 supports the electric drive motor 41 for the fan, which rotatingly drives hub 64 and thereby the whole fan rotor with blades 65 via a transmission 42. A further function of panel 61 is that it supports two mutually parallel manifolds for supplying medium to be cooled to the upper side of enthalpy exchanger panels 35. Discharge of cooled medium takes place via a lowermost panel 72, in which one or two manifolds likewise extend for discharging of cooled medium.

Enthalpy exchanger panels 35 extend in enthalpy exchanger 61 at an angle of about 25° relative to a vertical plane, particularly median plane 34. An advantage of this oblique position is that the airflows through the air throughflow space 37 need only be deflected through a relatively small angle, other than for instance in enthalpy exchanger 32 according to FIG. 8 and enthalpy exchanger 57 according to FIG. 12, both according to the prior art.

Spokes 73 connected to panel 71 support hub 64 via bearings.

Attention is drawn to the fact that electric motor 41 is placed completely outside the air throughflow space and can therefore form no obstacle to the air flowing through this space. The disruption of these airflows by drive belt 74, which transmits the rotation of motor 41 to hub 64 via respective pulleys, is negligible.

Located on the narrow lower side of the air throughflow space is a small zone without suction 53. The form thereof is however of a nature such that the airflow in the lower area of this small ineffective space is in no way obstructed.

The airflow-guiding element 62 has in its downstream end zone an outward converging axial annular protrusion 75 formed by two at a least slightly concave surfaces which connect to each other, i.e. the inner surface 70 adjacent to protrusion 75 and the combination of the cylindrical outer surface 76 of airflow-guiding element 62 and the upper surface 77 of the edge of panel 71 which connects thereto. These surfaces, to be defined as concave, transpose smoothly on their sides remote from protrusion 75 into the locally at least approximately partly toroidal, convex remaining surfaces of the airflow-guiding element, which also includes the drawn edge part of upper panel 71.

A screen 78 through which air can flow at least to some extent extends in median plane 34 in air throughflow spaces 37. This screen can for instance be embodied as windbreak mesh, consisting of a fabric of polyethylene monofilaments or for instance a metal gauze, both with an openness in the range of about 30%-70%.

FIG. 16 shows a perspective view of an assembly of a number of enthalpy exchangers 61 disposed relative to each other such that their median planes 34 are coplanar and their air throughflow spaces 37 are assembled into one combined air throughflow space. Attention is drawn to the fact that such an arrangement in one or more rows can also be used for other single enthalpy exchangers. Owing to the mutually connecting arrangement of upper panels 71 no inconvenience is caused in this transition area by boundary effects. The air flowing in from outside as according to arrows 47 will move to enthalpy exchanger panels 35 in substantially mutually parallel flow paths.

Airflow-guiding element 62 takes a divided form, as shown by the peripherally extending horizontal dividing join. During assembly of the fan and the airflow-guiding element 62 the lower part comprising the lower part of the V-shaped annular recess 68 is placed first, then the fan rotor with hub 64, blades 65 and ring 67 is placed such that the ring is located at least in the area surrounding the relevant truncated cone-shaped lower surface, and then the upper part of the airflow-guiding element 62 is placed, this part enclosing ring 67 with an upper truncated cone-shaped surface, these truncated cone-shaped surfaces together forming annular recess 68.

This construction principle with the placing of the lower part of the airflow-guiding element, the placing of the fan rotor and finally the placing of the upper part of the airflow-guiding element is also applied in the further embodiments of the invention to be described in the following.

Figure 17:
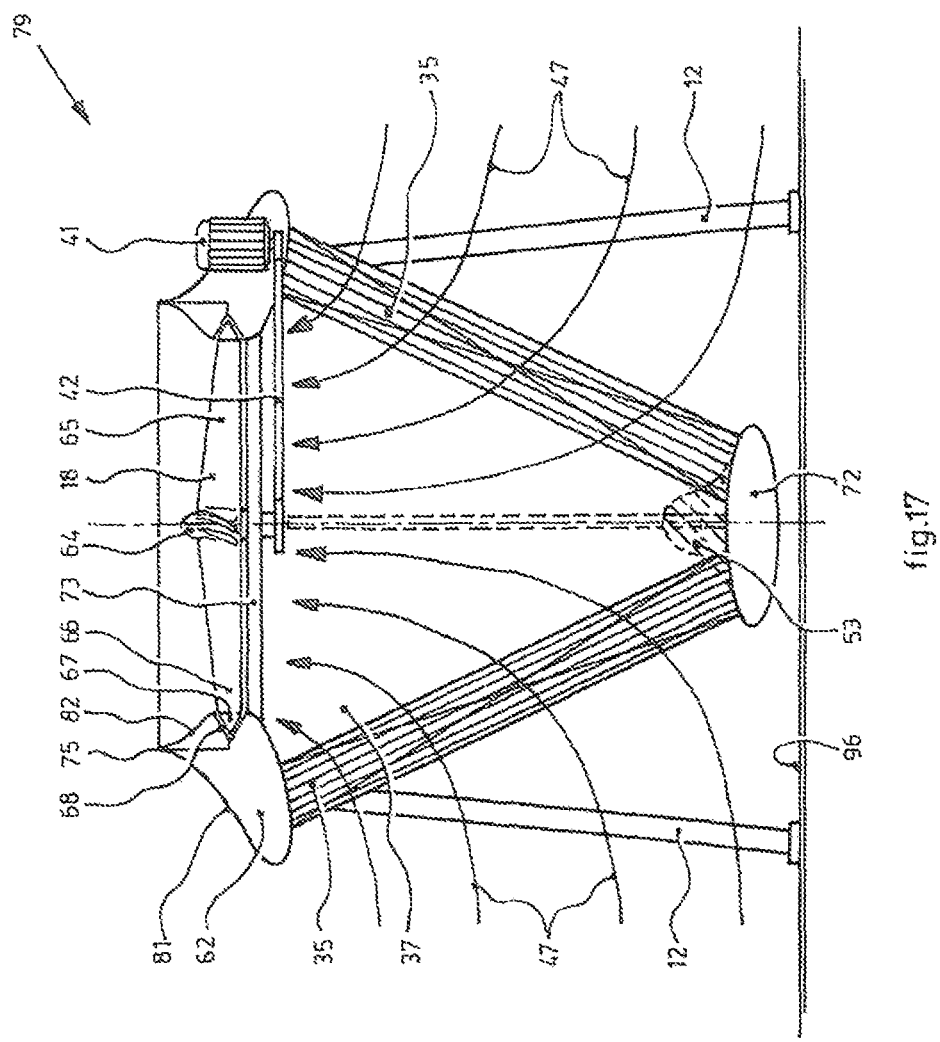
FIG. 17 shows a view corresponding with FIG. 15 of an enthalpy exchanger according to the invention with improved guiding of the flow through the fan and thereby through the whole enthalpy exchanger.

FIG. 17 shows a variant which largely corresponds with enthalpy exchanger 61 according to FIG. 15, but has several differences therefrom.

The upper/outer surface 81 of airflow-guiding element 62 is actually concave, other than the quasi-concave form in the embodiment according to FIG. 15, in which a dead zone may be present in the circumferential angular range, such that the local form rheologically approximates a concave form.

Dividing join 83 is further bent, while dividing join 80 according to FIG. 15 is straight. As shown in FIG. 17, dividing join 83 ends in the top of protrusion 75, whereby there need be no fear of any effect on the passing air, even in the case there were any size difference between the adjacent parts in situ.

Finally, attention is drawn to the form of lower panel 72 in FIG. 17, which has a better streamlined shape than the lower panel 72 according to FIG. 15. The effect on the passing air will however be small, as evidenced by the presence of a zone without suction 53 which is present at the same location as in FIG. 15, but is slightly smaller.

Figure 18:
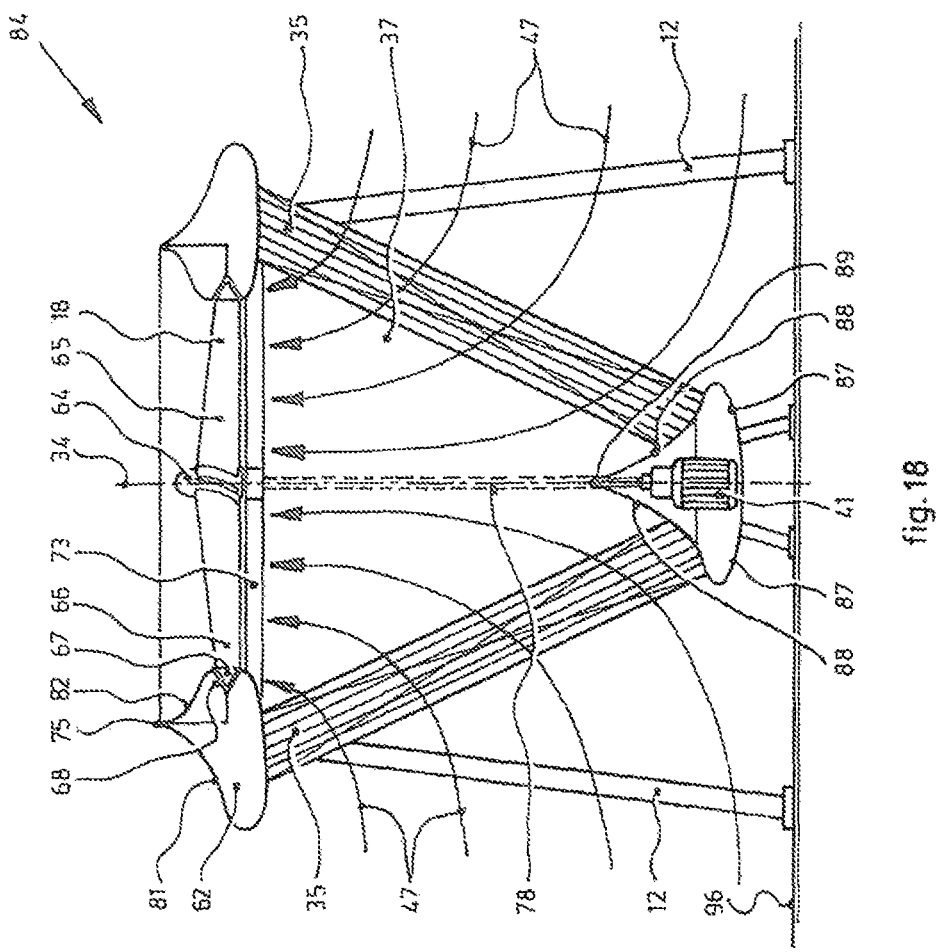
FIG. 18 shows a cross-sectional view corresponding with FIG. 17 of an embodiment which is improved still further by application of a deflection element in the lower zone of the air throughflow space.

FIG. 18 shows an enthalpy exchanger 84 in which the fan electric drive motor 41, with an output shaft which extends in median plane 34, drives fan hub 64 directly.

Motor 41 is disposed in an airflow deflection element 86. This deflection element 86 is disposed on the side of air throughflow space 37 remote from fan 18 for the purpose of smoothly deflecting the two airflows from the adjoining end zone of the relevant enthalpy exchanger panel in the direction of the central zone of fan 18. Just as the lower panels 72 according to FIGS. 15 and 17, deflection element 86 has a prismatic form, i.e. has the same cross-section at any longitudinal position in median plane 34. Deflection element 86 has a form which is mirror-symmetrical relative to median plane 34 and has two smoothly rounded convex lower edges 87, which transpose smoothly into respective concave deflection surfaces 88 which converge in a ridge 89 which is located in median plane 34 and where concave deflection surfaces 88 form an acute angle with each other.

Figure 19:
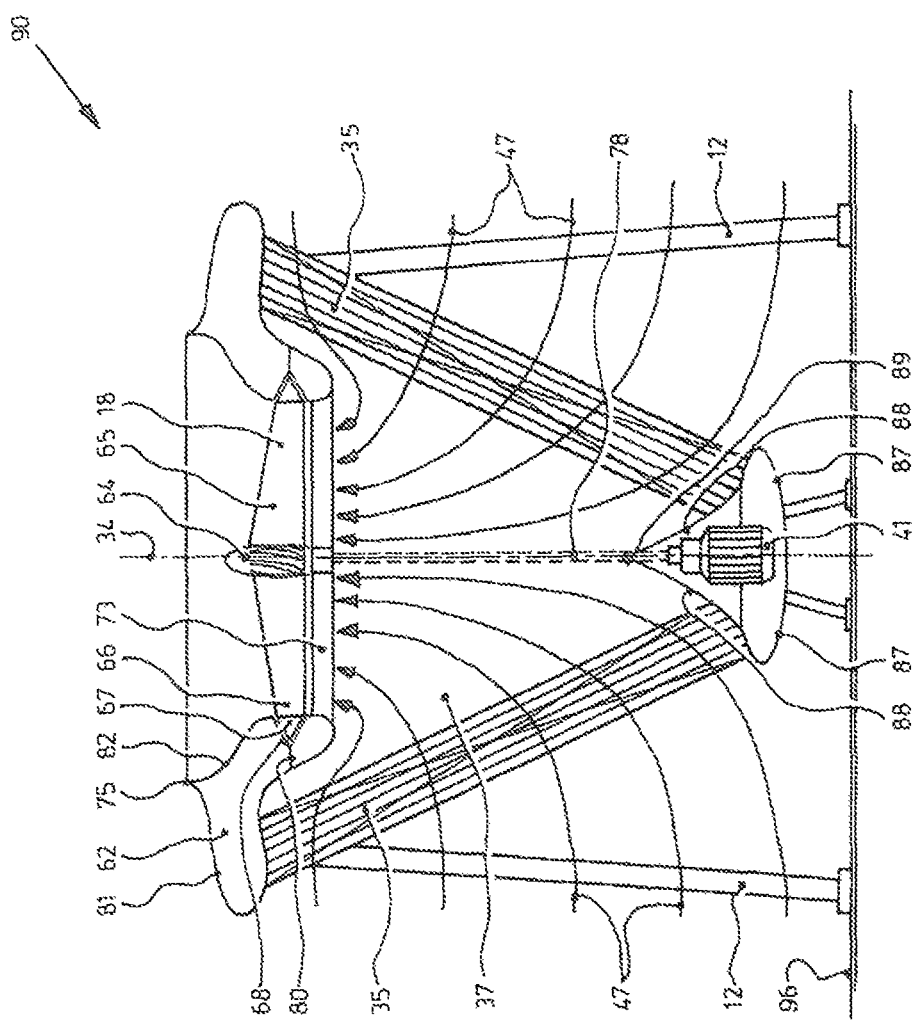
FIG. 19 shows a cross-section corresponding with FIG. 18 of another further developed embodiment, wherein the flow guiding in the area of the fan is improved still further.

FIG. 19 shows yet another development with an enthalpy exchanger 90, which differs from enthalpy exchanger 84 according to FIG. 18 in one respect.

The airflow-guiding element 62 in the embodiment according to FIG. 19 has a form which differs from the form of the functionally corresponding airflow-guiding element 62 according to FIG. 18.

It is immediately noticeable that fan 18 is recessed deeper and is located deeper in air throughflow space 37 over a substantial distance. As shown by the airflows on the upper side of air throughflow space 37 which are indicated with the upper arrows, an extra constriction of the airflow in the air throughflow space is hereby realized, which improves the stability of the airflows still further. In this embodiment use is once again made of horizontal dividing join 80.

It will be apparent that in the enthalpy exchangers 84 and 90 according to FIGS. 18 and 19 the airflow-guiding element 62 supports or accommodates the intake manifolds for enthalpy exchanger panels 35. This is also the case for the exemplary embodiments of the enthalpy exchangers according to the invention to be described below.

It is also noted in respect of FIGS. 18 and 19 that in enthalpy exchangers 84 and 90 the lower panel 72 with the airflow deflection element 86 and electric motor 41 is supported directly by the ground 96. This makes a substantial contribution to a lower sound production than in the prior art, particularly enthalpy exchanger 32 according to FIGS. 8, 9, 10 and 11, where it cannot be prevented that the whole frame, including the housing of metal plates, begins to co-vibrate with the electric motor, the drive and the fan.

Figure 20:
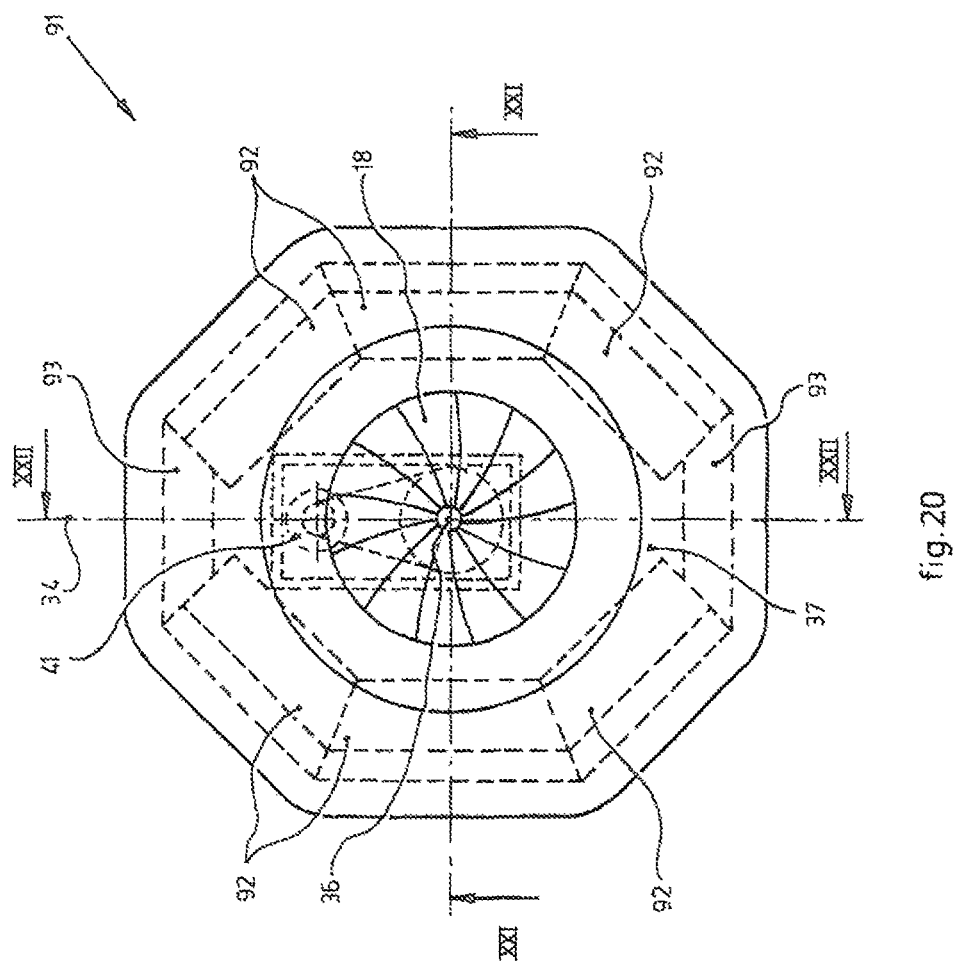
FIG. 20 shows a cross-section of an enthalpy exchanger with three enthalpy exchanger panels on both sides of the air throughflow space.

FIG. 20 shows an enthalpy exchanger 91 in yet another embodiment of the invention. In this embodiment six enthalpy exchanger panels, all designated with 92, are disposed such that they define in the plane of the drawing extending perpendicularly of central axis 36 of fan 18 a cross-sectional form which approximates the form of a polygon which is symmetrical relative to the median plane. Enthalpy exchanger panels 92 are arranged in two groups of three, wherein adjacent enthalpy exchanger panels 92 form angles of about 135° with each other. Placed between the free ends of the groups are two respective closed walls 93 disposed obliquely just as heat exchanger panels 92.

It will be apparent that with this form the accessibility on all sides of air throughflow space 37 is better than with the above shown and discussed embodiments. Ideally, the enthalpy exchanger panels would have to extend all the way around air throughflow passage 37. Such an embodiment will be shown in FIGS. 30, 31 and 32. The upper edge 94 visible in FIG. 20 has a rounded form and thereby also has a streamlining function.

Figure 31:
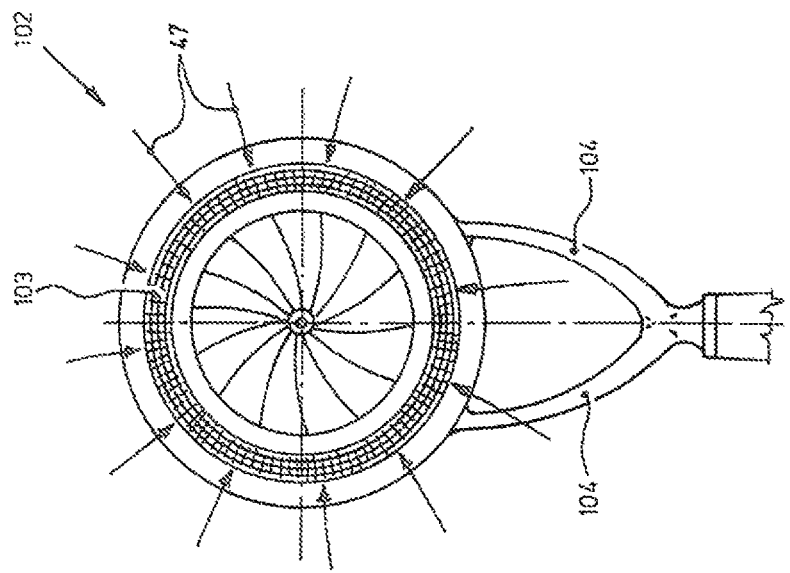
FIG. 31 shows the cross-section XXXI-XXXI of FIG. 30.
Figure 30:
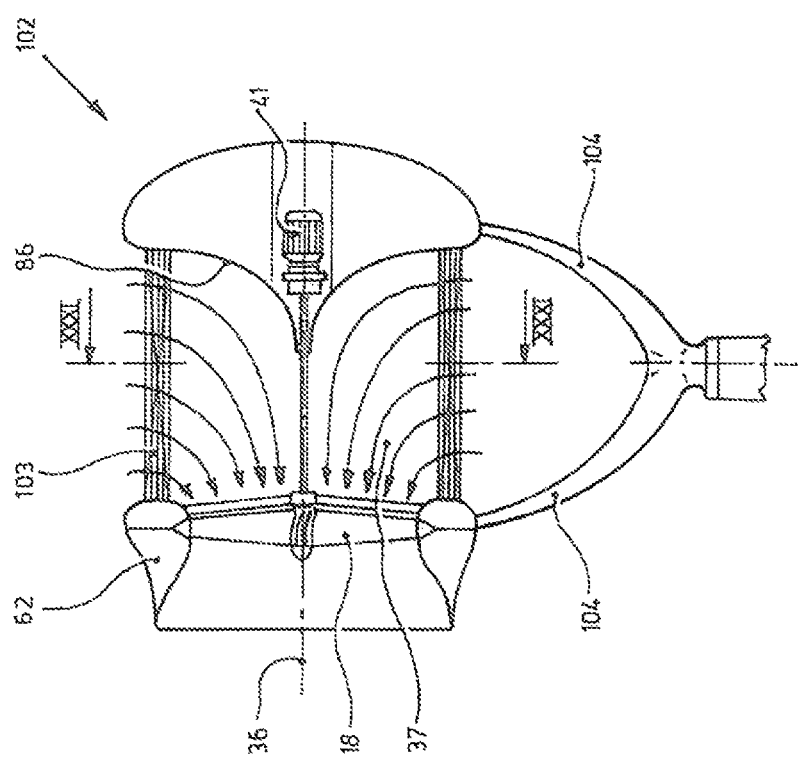
FIG. 30 shows a cross-section through a rotation-symmetrical enthalpy exchanger according to the invention with an advanced flow guiding in the area of the fan and on the lower side of the air throughflow space.

Enthalpy exchanger 91 according to FIG. 20 approximates to some extent the rotation-symmetrical form of the enthalpy exchanger according to FIGS. 30, 31 and 32, which is deemed ideal.

Figure 21:
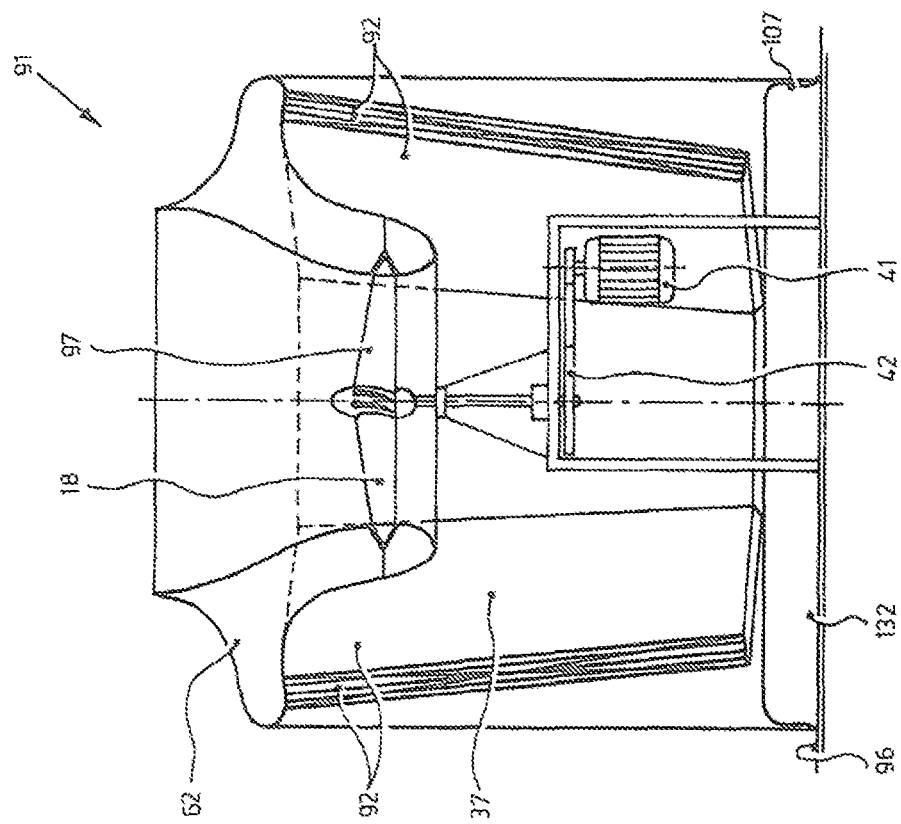
FIG. 21 shows a view corresponding with FIG. 19 of the embodiment according to FIG. 20 with greatly improved flow guiding and strongly convergent airflow through the air throughflow space.
Figure 22:
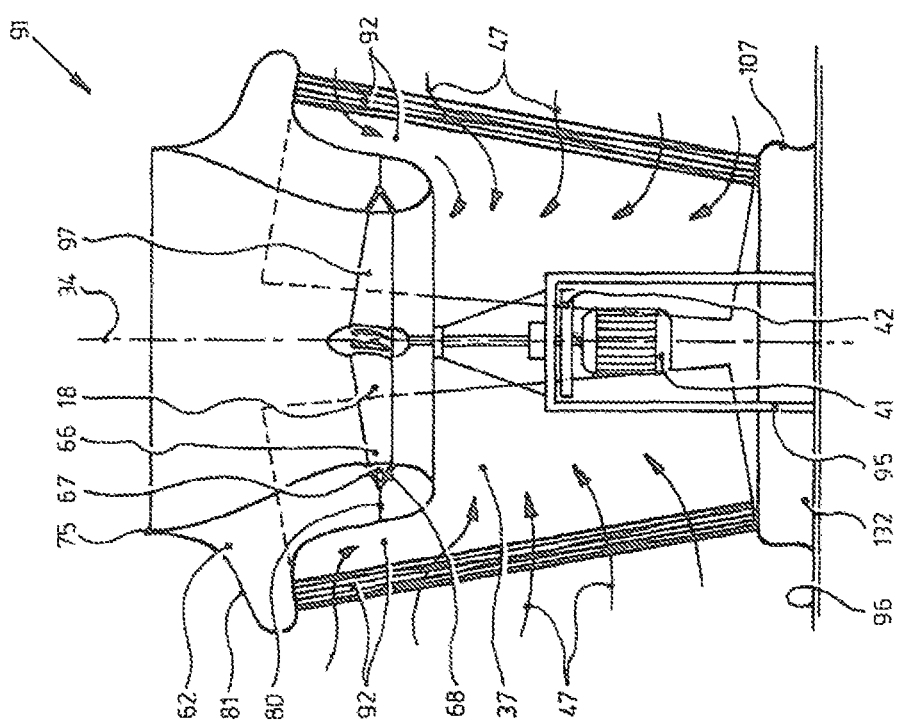
FIG. 22 shows a top view corresponding with FIG. 20 of a variant wherein the electric drive motor for the fan is placed directly below the fan.

FIGS. 21 and 22 shows the vertical sections XXI-XXI and XXII-XXII of FIG. 20. Enthalpy exchanger 91 shows a number of significant differences compared to enthalpy exchanger 84 according to FIG. 18. The first difference lies in the form of airflow-guiding element 62. The form thereof is related to the airflow-guiding element 62 according to FIG. 19, but extends even further into air throughflow space 37 than in FIG. 19.

Edge parts 107 of bottom plate 132 and the edge parts of airflow-guiding element 62 have a flow form such that inflowing air 47 is guided calmly and smoothly and can flow into the air throughflow space calmly and without turbulences, vortices or dead zones.

Fan 18 is supported by a trestle 95 which is placed directly on the ground 96 or is anchored therein. Trestle 95 also supports electric motor 41 and transmission 42. Electric motor 41, transmission 42 and rotor 97 of fan 18 are thus completely clear of the further structure of enthalpy exchanger 91. This enthalpy exchanger thereby produces very little sound. For purposes of comparison: an enthalpy exchanger 91 with substantially the same dimensions emits more than 25 dB SPL less sound than a similarly dimensioned prior art enthalpy exchanger 32 as drawn in FIG. 8. This same sound reduction is realized with other exemplary embodiments of the invention, particularly the enthalpy exchanger 106 according to FIG. 33 and the enthalpy exchanger 125 according to FIGS. 40, 41, 42 and 43.

FIG. 23 shows a top view according to FIG. 20 of an enthalpy exchanger 98 in yet another embodiment of the invention.

Figure 25:
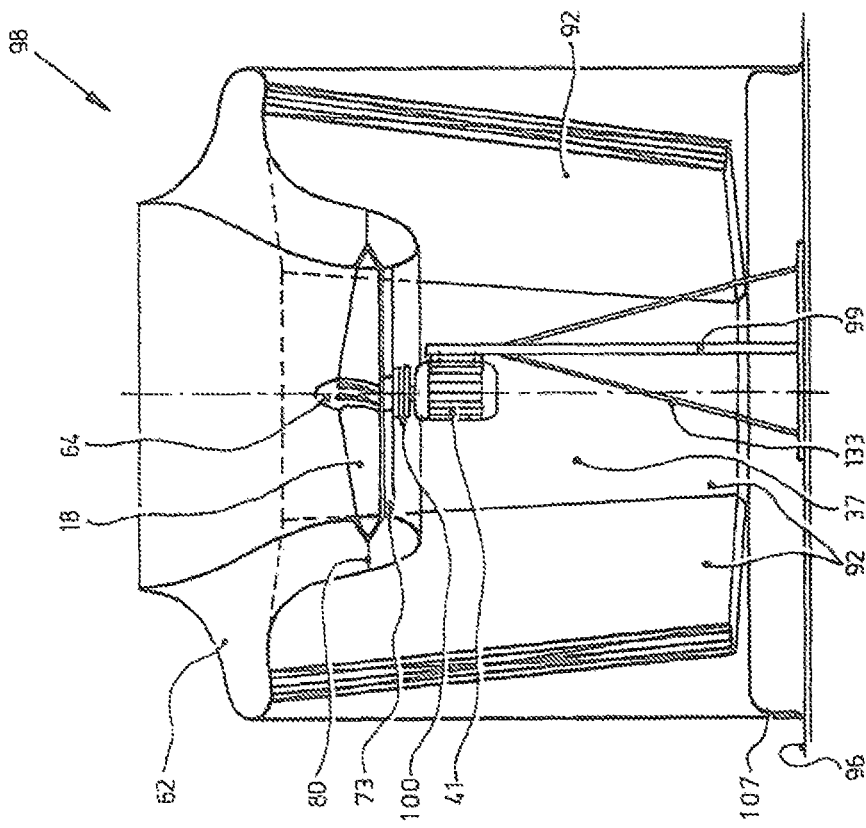
FIG. 25 shows the cross-section XXV-XXV of FIG. 23.
Figure 24:
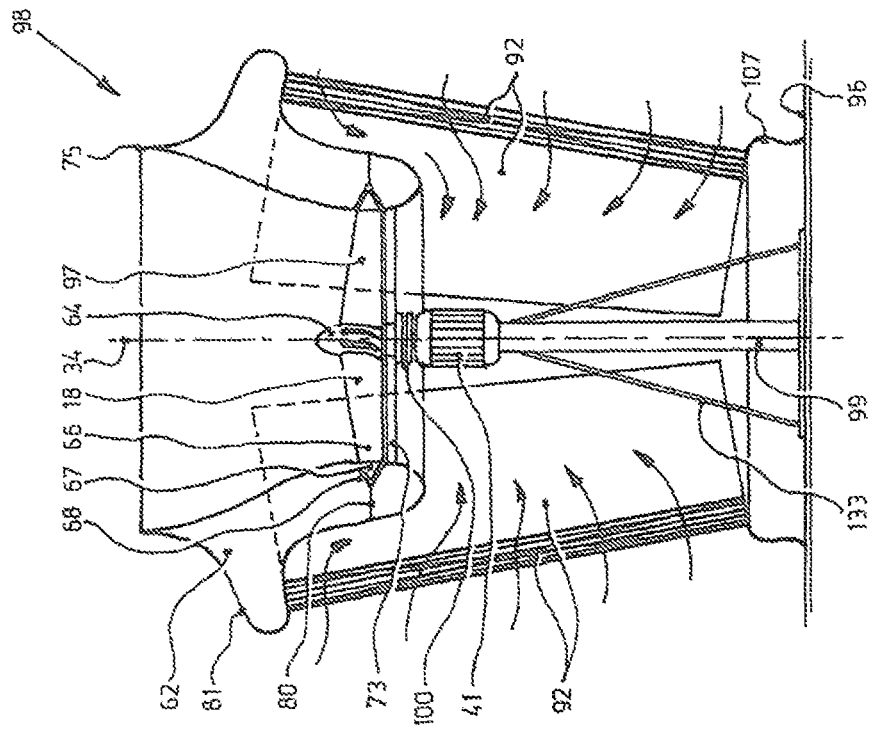
FIG. 24 shows the cross-section XXIV-XXIV of FIG. 23.

FIGS. 24 and 25 show that this enthalpy exchanger 98 differs in only one respect from the enthalpy exchanger 91 according to the foregoing figures, this being the arrangement of the drive means for fan 18. Electric motor 41 is in this embodiment directly supported by a support leg 99 with guy wires 133 and drives rotor 97 of fan 18 via an electromagnetic transmission 100. This construction has per se the same acoustic advantages as described above with reference to FIGS. 20, 21 and 22. The use of an electromagnetic transmission has the advantage that it can if desired be electronically variable and takes up little space.

Figure 26:
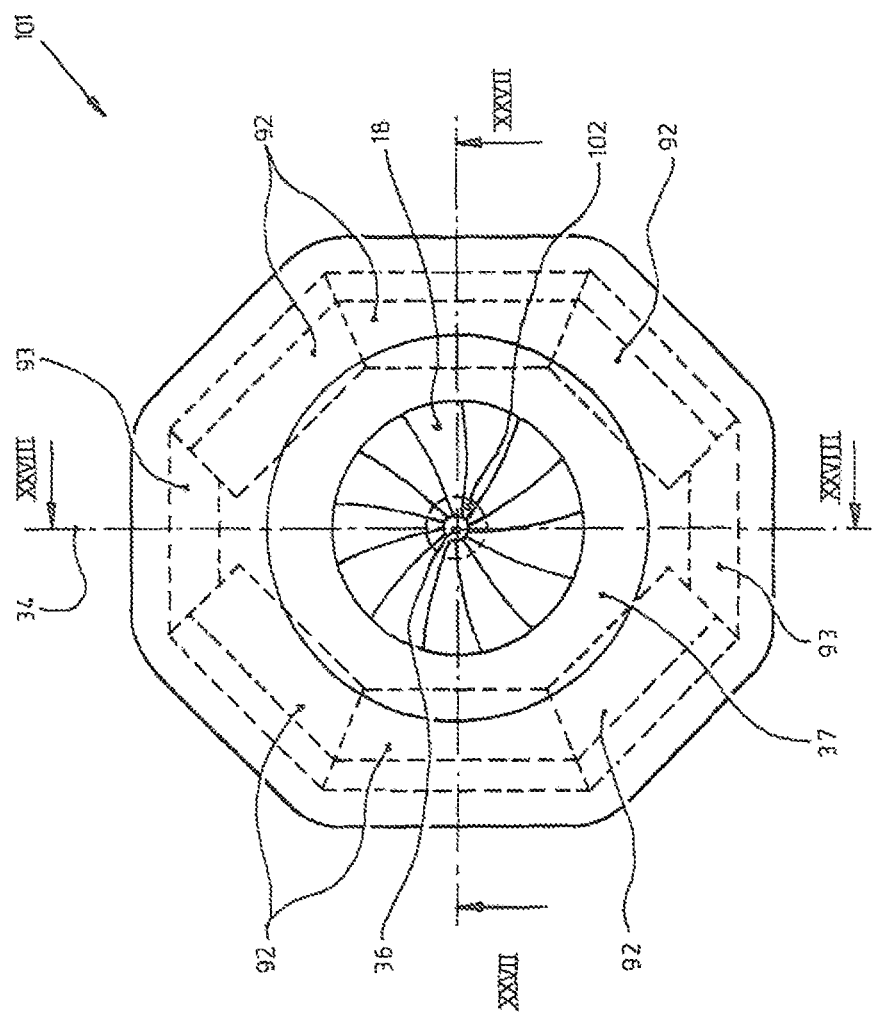
FIG. 26 shows a top view corresponding with FIG. 23 of a variant wherein the electric drive motor is centrally supported.

FIG. 26 shows yet another variant. As shown in FIGS. 27 and 28, enthalpy exchanger 101 comprises a very flat electric motor 102 which takes up little space and which drives rotor 97 of fan 18 directly. Just as electromagnetic transmission 100, the motor can be of a variable type, whereby the rotation speed produced by the motor is adjustable.

Figure 29:
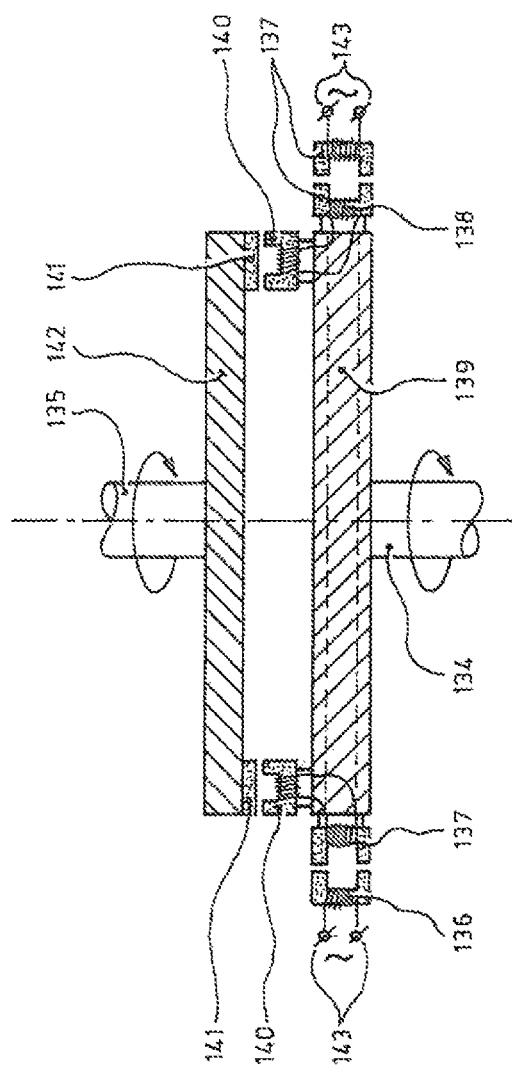
FIG. 29 shows a schematic cross-section on enlarged scale of the electric coupling between the drive motor and the fan rotor in the embodiment according to FIGS. 26, 27 and 28.

FIG. 29 shows a cross-sectional highly schematic view of electromagnetic transmission 101, which is placed between the input drive shaft 134 driven by electric motor 41 according to FIGS. 24 and 25 and the output shaft 135 directly connected to hub 64 of fan rotor 97.

Primary windings 136 receive suitable alternating drive currents from an electronic power unit (not drawn) via electrical connections 143. Primary windings 136 co-act electromagnetically with U-shaped cores 137, which in turn co-act in contactless manner with substantially identical U-shaped cores 137 which are rotatably disposed relative to the fixedly disposed cores with primary windings 136 and which are supported by a first disc which is rigidly connected to input drive shaft 134. Co-acting with the rotatably disposed U-shaped cores 137 are secondary windings 138, which in turn transmit the thus induced electric currents to electromagnets 140 which likewise have windings and U-shaped cores co-acting therewith and which are also disposed for rotation with first disc 139. The variable magnetic fields which are thus present between the poles of these U-shaped electromagnets co-act in forced-transmitting manner with permanent magnets 141, which are disposed in the manner of a collar in the same way as the above described electromagnets and are rigidly connected to a second disc which is rigidly connected to an output shaft 135 connected to hub 64. The relative rotation speed of first disc 139 and second disc 142, and thereby the transmission ratio of the input drive shaft and output shaft 135, can be adjusted by adjusting the changes over time of the alternating currents supplied to electrical connections 143 suitably and as desired.

FIGS. 30, 31 and 32 show a rotation-symmetrical enthalpy exchanger 102. This comprises a rotation-symmetrical enthalpy exchanger panel 103 which draws in air 47 in radial direction on all sides, without directional preference, to the substantially cylindrical air throughflow space 37. Airflow-guiding element 62 in turn has a slightly different form that the form applied in other exemplary embodiments of the enthalpy exchanger according to the invention.

Corresponding to the elongate, substantially prismatic airflow deflection element 86 as applied in the enthalpy exchanger 84 according to FIG. 18, the rotation-symmetrical enthalpy exchanger 102 according to FIGS. 30, 31 and 32 comprises a rotation-symmetrical airflow deflection system 86. Electric motor 41 is accommodated therein, just as in enthalpy exchanger 84 according to FIG. 18.

The form of airflow-guiding element 62 is slightly different than in the above shown and described embodiments.

It is noticeable that enthalpy exchanger 102 extends horizontally with its central axis, also central axis 36 of fan 18. Enthalpy exchanger 102 is supported by the four support legs 104 through which medium can flow, and is disposed by means of means which are not drawn in detail for rotation around a vertical central axis such that it can be placed in the direction of the wind under the influence of a wind direction measuring sensor 144.

As shown particularly in FIG. 31, the cylindrical structure is essentially the ideal form, which is approximated by enthalpy exchangers 91 according to FIG. 20, 98 according to FIGS. 23 and 101 according to FIG. 26.

Figure 33:
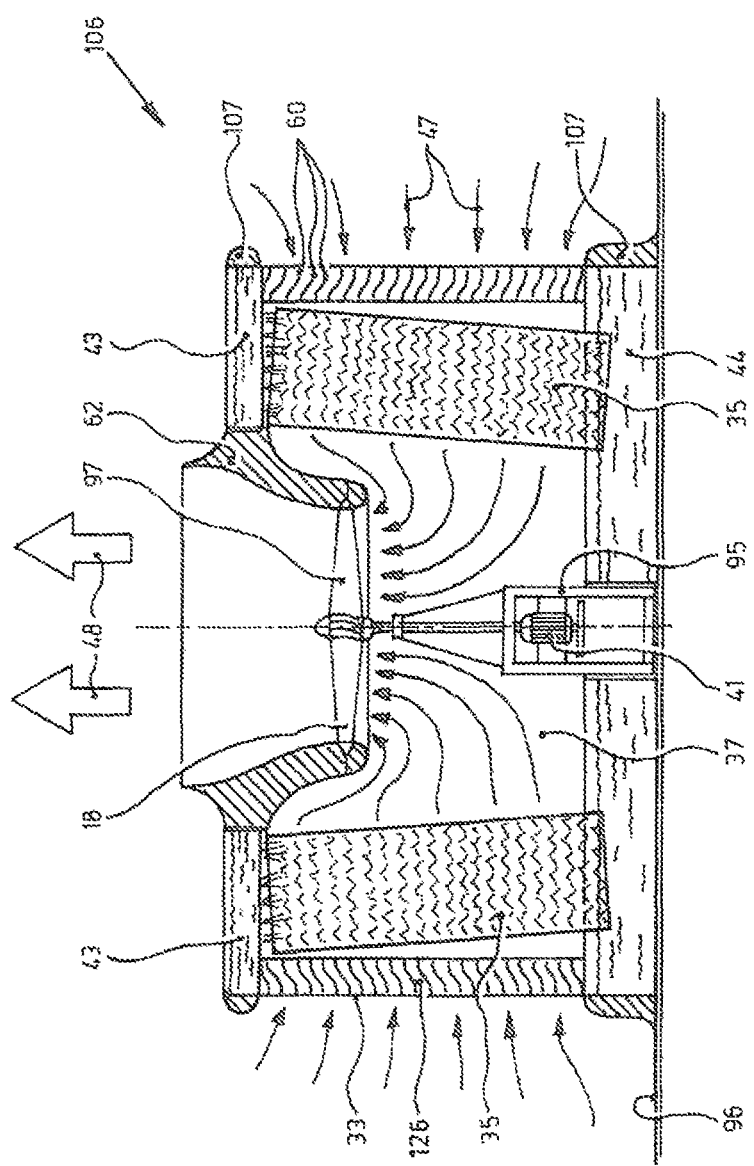
FIG. 33 shows a cross-sectional view corresponding with FIG. 11 of a completely upgraded version of the enthalpy exchanger according to FIG. 11, corresponding to the diverse aspects of the teaching of the invention.

FIG. 33 shows an enthalpy exchanger 106. A comparison with FIG. 11, which shows the prior art enthalpy exchanger 32 by Baltimore, immediately demonstrates that is a certain relation between the two enthalpy exchangers. Enthalpy exchanger 106 according to FIG. 33 can be deemed an upgraded, superior version of enthalpy exchanger 32 which produces a very high output, is much lighter, is less expensive and the performance of which is superior, in respect of both its efficiency and its very low sound emission.

Stated below in this respect are the aspects wherein enthalpy exchanger 106 differs from enthalpy exchanger 32, with mention of the advantages realized with the changes in question.

Added to fan 18 is an airflow-guiding element 62 which corresponds almost wholly to the airflow-guiding elements 92 as applied in the enthalpy exchangers 91 according to FIGS. 20, 21 and 22, 98 according to FIGS. 23, 24 and 25, and 101 according to FIGS. 26, 27 and 28. The difference with the above discussed enthalpy exchangers according to the invention can be seen in the greater horizontal extension of the outward extending parts, which is determined by the difference between the thickness of enthalpy exchanger panels 92 according to the stated, above discussed enthalpy exchangers 91, 98 and 101, which are of the dry type, and the considerably thicker enthalpy exchanger panels 35 in device 106 according to FIG. 33, which are of the wet type.

In respect of the schematically shown forms of the airflows through air throughflow space 37 reference is made to the description given above with reference to the stated figures.

The central arrangement of motor 41, which is supported on a trestle 95 by the ground 96, corresponds to the arrangement of motor 41 on trestle 95 in enthalpy exchanger 91, wherein particular reference is made to the cross-section according to FIG. 21, which shows the similarity between the two enthalpy exchangers 91 and 106 in this respect.

Due to the fact that trestle 95 rests only on the ground 96 and supports motor 41 together with the transmission means, and rotor 97 of fan 18 and these parts are not mechanically coupled with any other part of enthalpy exchanger 106, no transmission of mechanical vibrations to these other parts will take place, whereby they will emit no sound.

Enthalpy exchanger panels 35 are provided with water from the upper side from a water supply reservoir 43, which is provided for this purpose with per se known sprayers (not drawn). Part of the water flowing through enthalpy exchanger panels 35 will evaporate, whereby cooling occurs of the unevaporated water which continues to flow and which is then collected in a water collecting reservoir 44. Attention is drawn to the fact that, in contrast to the stainless steel water containers 43, 44 in prior art enthalpy exchanger 32, as shown in, among others, FIG. 8, the water containers 43, 44 in enthalpy exchanger 106 according to the invention, as shown in FIG. 33, can also be manufactured from fibre-reinforced polyester or another suitable plastic.

Added to each air inlet 33 is a peripherally extending inlet frame comprising a number of edge parts 107 connecting to each other peripherally relative to air inlet 33. These edge parts 107 have streamlined shapes such that they guide the air 47 entering air inlet 33 in effective manner and also prevent the air 48 blown out by fan 18 being drawn once again into air inlet 33.

Attention is further drawn to the specific form of louvres 60, which differ essentially from the forms of louvres 60 of enthalpy exchanger 32, as shown particularly clearly in FIG. 11. In this respect reference is made for the sake of clarity to FIG. 34, which clearly shows the arrangement and form of louvres 60 according to the invention in perspective view.

A pattern of mutually parallel, identical horizontally extending louvres 60 which is placed on the outer side is added to the two air inlets 30 on either side of device 106. According to the invention, louvres 60 each have a more or less sinusoidal sectional form, which is clearly visible in FIG. 34 with a length of one wavelength, wherein the tangents to the inlet zone and the outlet zone of each louvre are mutually parallel. Louvres 60 have mutual distances such that there are no lines of sight between entry side or inlet zone 108 and outlet zone 109 of the pattern of louvres. The louvres have matte black surfaces. Light from outside, and certainly direct sunlight, is prevented in the described manner from being able to reach the wet enthalpy exchanger panels 35.

Figure 34:
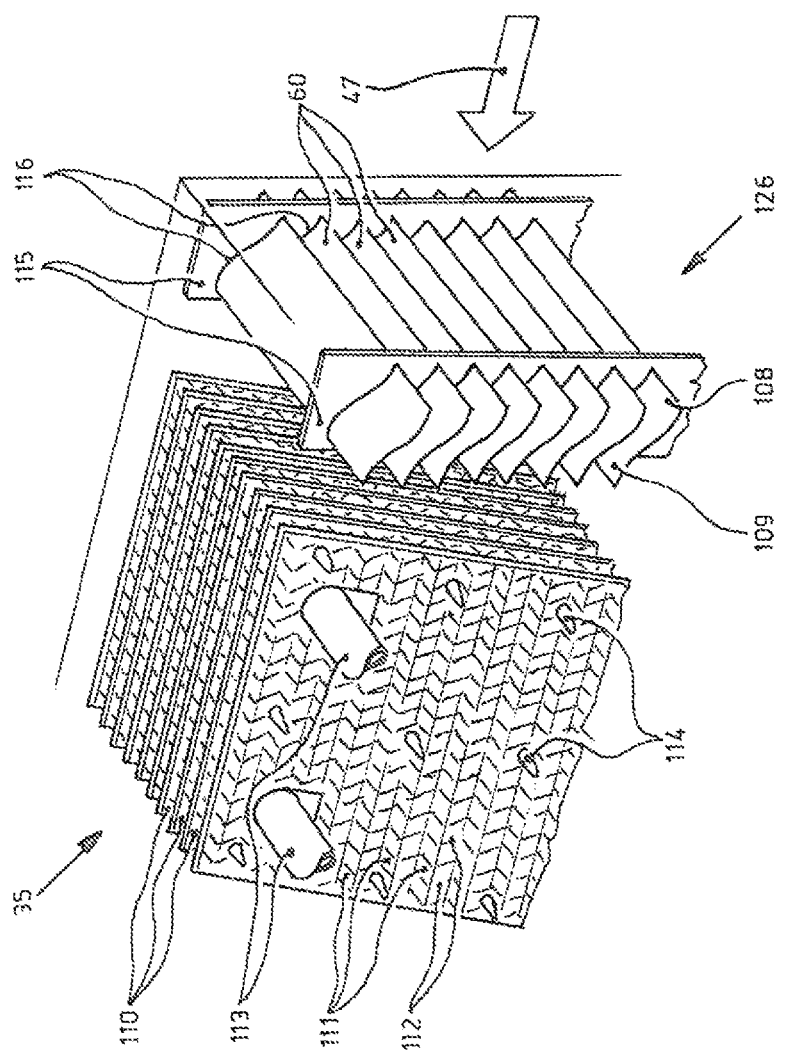
FIG. 34 shows a perspective view on enlarged scale of a part of the top right inflow side of the enthalpy exchanger according to FIG. 33 with the inlet slats curved in a sine shape and the wetted, suspended corrugated PVC evaporator plates.

FIG. 34 clearly shows that louvres 60 are disposed in an inclining position such that inlet zones 108 and outlet zones 109 of louvres 60 extend in the direction of the airflow 47 entering from outside.

The ratio of the wavelength and the amplitude of the wave shapes amounts to a minimum of 3. With the described arrangement it is achieved that the direction of the air 47 flowing in from outside leaves the pattern of louvres 60 again in the same direction, albeit at a slightly different height, after passing the pattern of louvres 60, such that the airflow reaches the entry side of the relevant enthalpy exchanger panel in substantially horizontal direction. Reference is made to the highly disadvantageous arrangement and form of louvres 60 in prior art device 32 which are described with reference to FIG. 11.

As shown in the perspective view of FIG. 34, enthalpy exchanger panels 35 have a number of vertically suspended corrugated plates lying at fixed mutual distances from each other and each having a corrugated profile 111, wherein corrugations 111 have identical wave shapes 112 disposed adjacently of each other in the principal plane of the corrugated plates.

Corrugated plates 110 are provided with through-holes so as to be suspended by means of suspension pipes 113. The mutually equal distances between corrugated plates 110 is ensured by the presence of spacers 114 forming part of corrugated plates 110.

Corrugated plates 110 consist of PVC. By using PVC, which comprises chlorine, a sufficiently antibacterial and antimicrobial action is obtained, whereby microbe contamination and algal growth need not be feared in practice, this effect being intensified further by the described form, structure and matte black surfaces of louvres 60, whereby irradiation of sunlight on corrugated plates 110 is prevented.

FIG. 33A with the FIGS. 33A', 33A" and 33A'" forming part thereof enables a direct comparison of the performance of enthalpy exchanger 106 according to the invention to prior art enthalpy exchanger 32.

FIG. 33A' immediately shows that in enthalpy exchanger 106 there are no zones without suction on the entry side of air throughflow space 37. Each enthalpy exchanger panel 35 is thereby utilized effectively over its whole height and surface area.

FIG. 33A" shows that the airflow has at any position a substantially higher speed and a less variable speed than in the prior art, as shown in FIG. 11A".

FIG. 33A'" shows that the outflow velocity profile is not impeded by the presence of any zone without suction 53, whereby the airflow enables a considerably higher effective flow while having the same motor power. If a lower flow corresponding to the limited flow according to the prior art (FIG. 11A'") could be accepted, the electrical power supplied to motor 41 can be limited. In order however to better utilize the capacity of enthalpy exchanger 106, it is recommended to make the airflows as intensive as possible by having fan rotor 97 rotate at a normal rotation speed. It must be noted here that advanced fan 18 according to the invention requires a considerably lower rotation speed relative to the known prior art fan 5 for the same output.

As already noted, louvres 60 extend horizontally in mutually parallel equidistant relation. They are supported by a number of vertical bearing strips 115 provided with sinusoidal, amply dimensioned slotted holes which are mutually registered between strips 115 and through which louvres 60 are inserted into their end position during production.

FIGS. 35, 36, 37, 38 and 39 all show the same advanced and very high-quality fan 18, these five fans however differing from each other in respect of the drive used.

Figure 35:
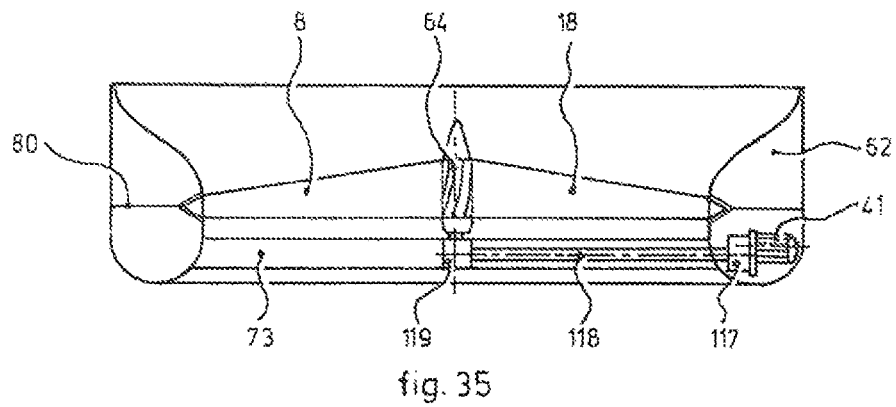
FIG. 35 shows a cross-section through an advanced fan according to the invention with side driving with one single motor and a right-angled transmission.

In the embodiment according to FIG. 35 the rotation-symmetrical airflow-guiding element 62 accommodates electric drive motor 41 which rotatingly drives hub 64 of fan rotor 8 via a reducer 117, a drive shaft 118 and a right-angled transmission 119. The hub is supported for rotation via a bearing by airflow-guiding element 62 which is supported by means of a number of spokes 73 disposed in angularly equidistant manner It is noted that the airflow-guiding element has a specific form with a more or less cylindrical outer surface. Attention is however drawn to the fact that the different drives according to FIGS. 35, 36, 37, 38 and 39 do not depend on the form of airflow-guiding element 62. They are however specific to the advanced fan 18, which is described with reference to, among others, FIG. 15 and the subsequent figures of exemplary embodiments of the enthalpy exchanger according to the invention.

Figure 36:
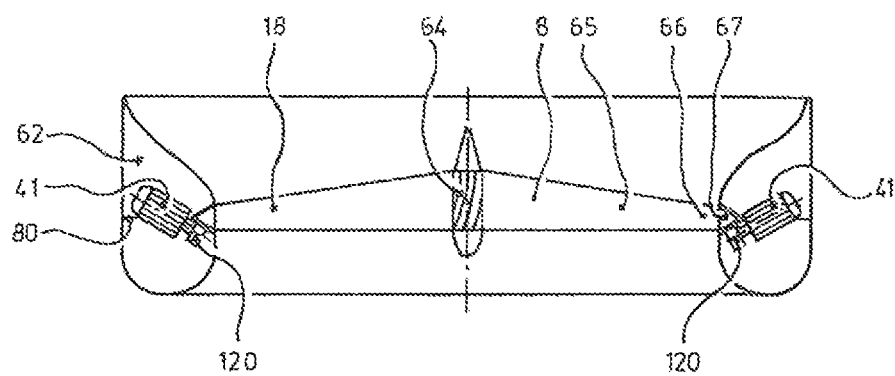
FIG. 36 shows a view corresponding with FIG. 35 of such a fan, which is driven with a number of peripherally arranged motors and drive wheels set into rotation thereby.

In the embodiment according to FIG. 36 use is made of four drive motors 41 disposed at mutual angles of 90°, with drive rollers 120 which engage with some pressure, for instance by means of spring means, on the lower surface of ring 67 which mutually connects end zones 66 of blades 65.

Figure 37:
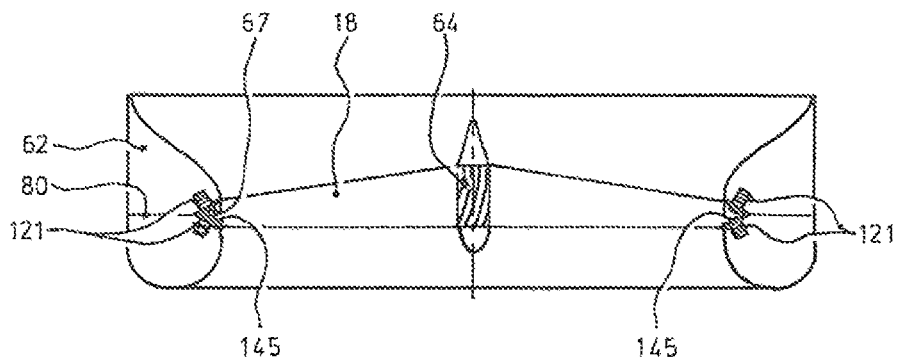
FIG. 37 shows a view corresponding with FIGS. 35 and 36 of the fan with electromagnetic suspension and edge driving of the outer ring.

In the embodiment according to FIG. 37 ring 67 forms the rotor of an annular induction motor 145. Ring 67 is provided for this purpose on both its truncated cone-shaped upper surface and its truncated cone-shaped lower surface with for instance a number of permanent magnets or, via an annular rotary transformer, with electromagnets. These magnets forming part of the ring co-act with two collars of electromagnets 121, which are disposed such that they can co-act with the described magnets of ring 67. With the structure described briefly above the ring 67 and thereby the whole rotor 8 can be set into rotation with sufficient power by a suitable electronic control. The described annular induction motor 120 can further be embodied such that during operation it also provides for magnetic suspension of ring 67, which thus provides for magnetic bearing of rotor 8. The usual central bearing of hub 64 is in principle not necessary in that case, just as in the embodiment according to FIG. 36, wherein ring 67 is after all supported by the four electric motors 41. It is however desirable, for instance for maintenance during standstill, for an engineer to be able to rotate rotor 8 through some distance by hand. This is not possible with magnetic suspension alone, which is active only during operation of fan 8. Use can therefore advantageously be made of an auxiliary bearing (not drawn) which is supported by airflow-guiding element 62 via spokes 73 in the manner of FIG. 35.

Figure 38:
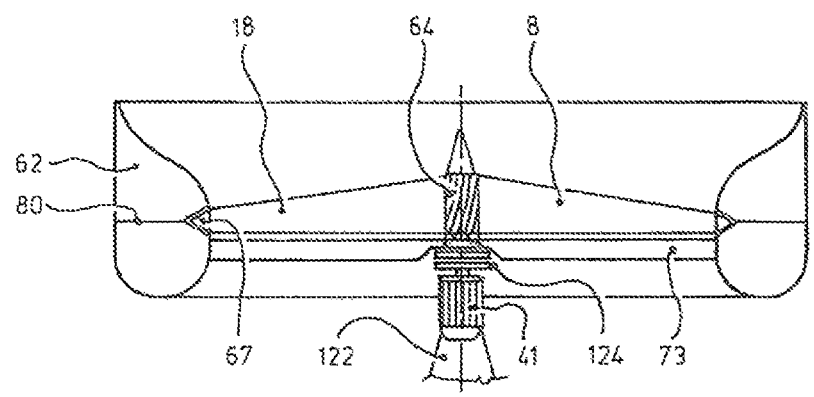
FIG. 38 shows a view corresponding with FIGS. 35, 36 and 37 of the fan with a centrally disposed electric motor with electromagnetic transmission.

In the embodiment according to FIG. 38 a centrally disposed electric motor 41 is added to fan 18, which motor is supported by a bearing construction 122, for instance a trestle, and which drives hub 64 and thereby fan rotor 8 in rotation via a variable electromagnetic transmission 123. The rotation speed of rotor 8 can be adjusted as desired with variable transmission 123.

Figure 39:
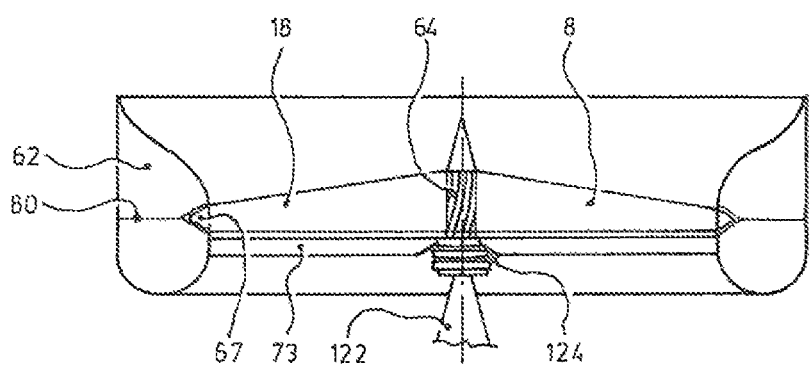
FIG. 39 shows a view corresponding with FIGS. 35, 36, 37, 38 of the fan with an electromagnetic transmission which also serves as electric drive motor.
Figure 40:
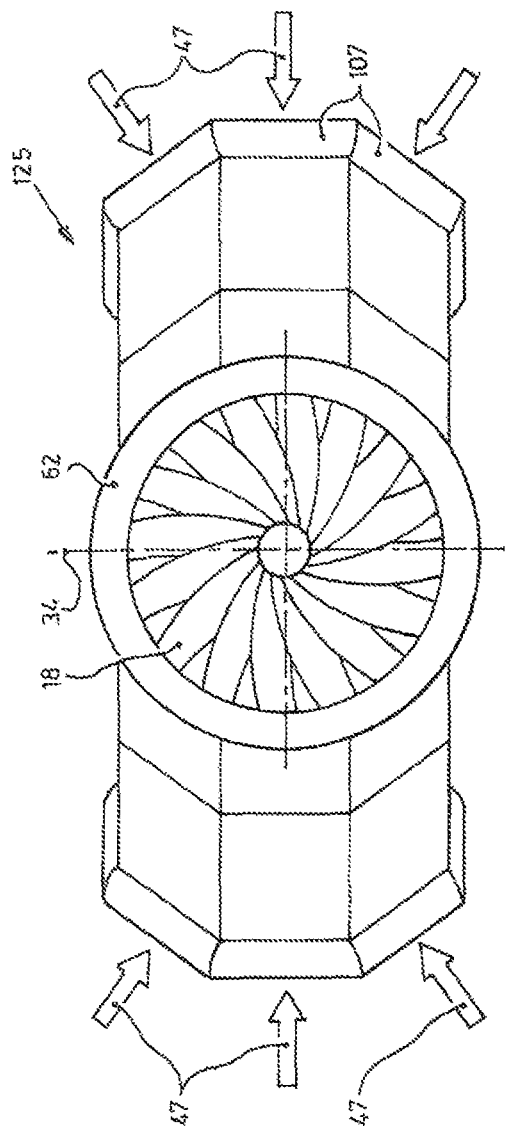
FIG. 40 shows a top view of an advanced variant in accordance with the diverse aspects of the teaching of the invention, which is to be deemed an upgraded plastic embodiment of the wet cooler or enthalpy exchanger according to FIG. 8.
Figure 42:
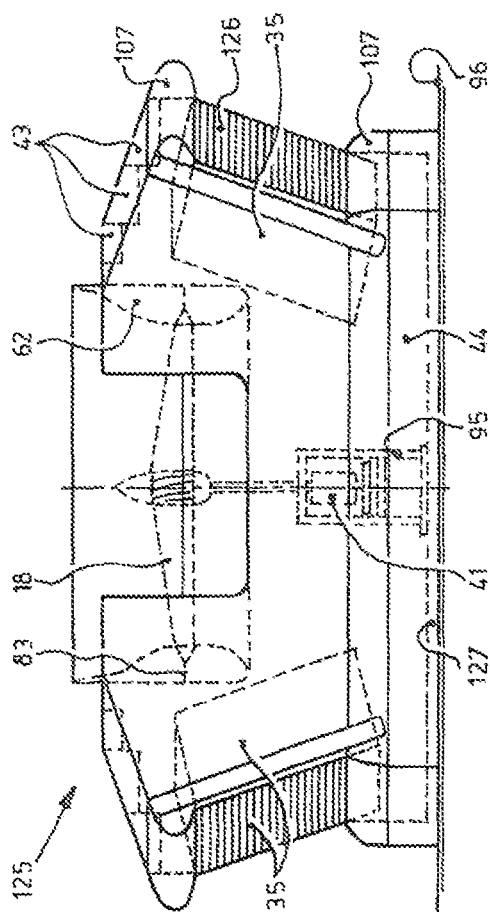
FIG. 42 shows a partially transparent front view of the enthalpy exchanger according to FIG. 40.
Figure 41:
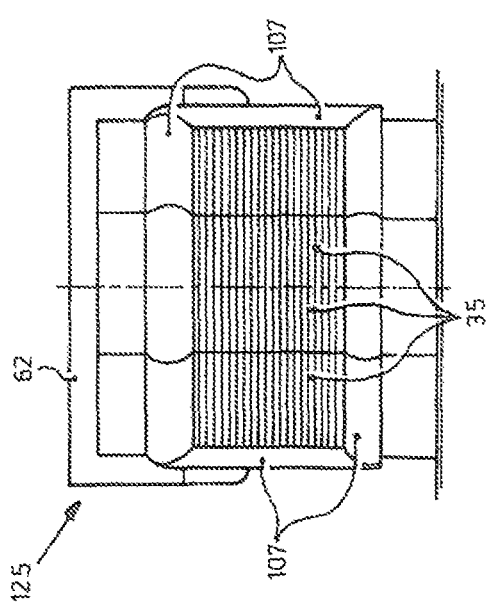
FIG. 41 shows a side view of the enthalpy exchanger according to FIG. 40.

In the embodiment according to FIG. 39 a bearing construction 122 supports a variable drive motor 124 which takes an electromagnetic form. Such a motor, which, compared to FIG. 38, fulfills both the function of motor 41 and that of variable transmission 123, can be of a type which takes up little space.

FIGS. 40, 41, 42, 43 and 44 show an enthalpy exchanger 125 of a subsequent type according to the invention. This is a further advanced variant of the above shown and discussed enthalpy exchanger 106 according to FIGS. 33 and 34. The technical principles according to the invention shown there also apply to a significant extent to enthalpy exchanger 125. In respect of the properties and the performance of enthalpy exchanger 125 a comparison must be made to prior art enthalpy exchanger 32 according to FIGS. 8, 9, 10, 11.

Figure 43:
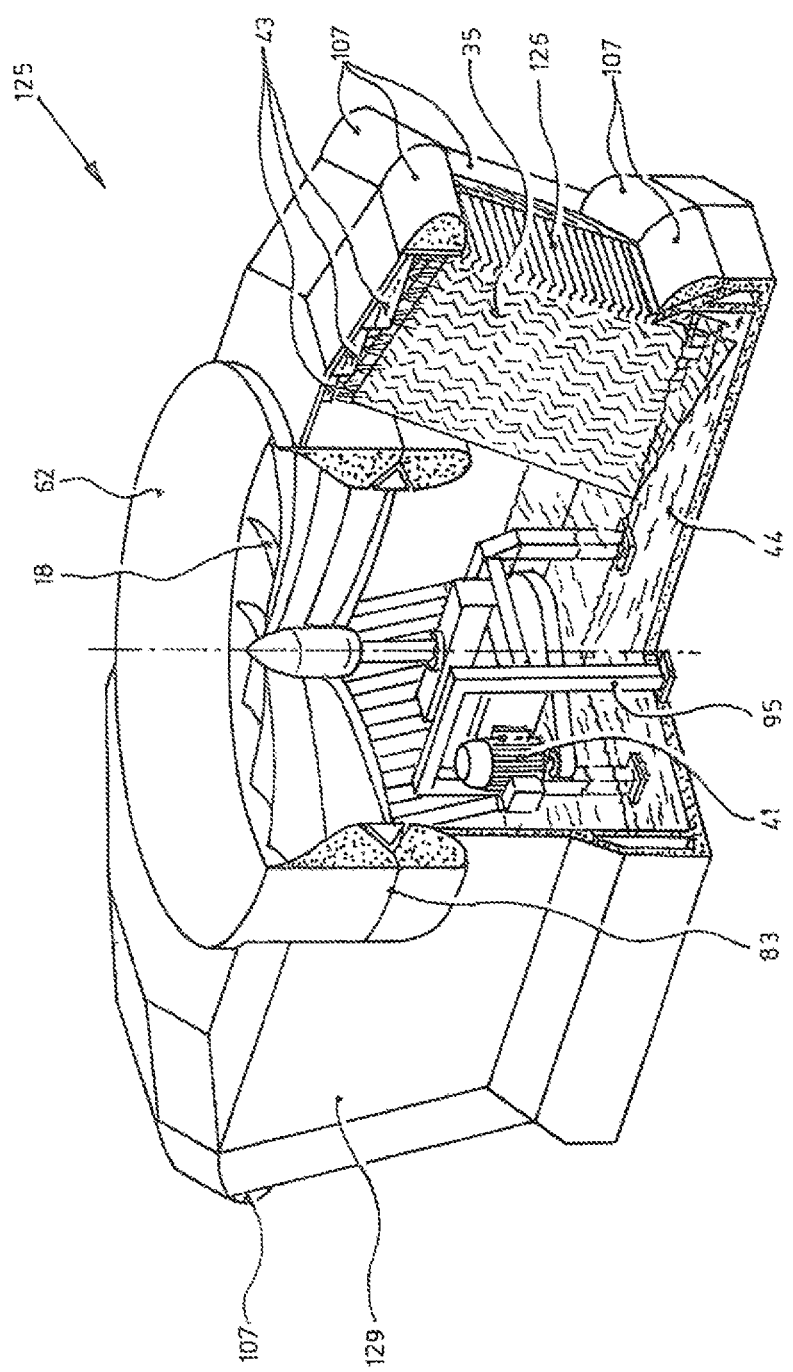
FIG. 43 shows a partially cut-away perspective view of the enthalpy exchanger according to FIGS. 40, 41 and 42.

A comparison between enthalpy exchanger 106 according to the invention of FIG. 33 and the enthalpy exchanger 125 as shown in FIG. 43 shows that enthalpy exchanger panels 35 in enthalpy exchanger 125 have a greater thickness, which means that the area over which effective flow of medium to be cooled takes place can be substantially greater, which increases the efficiency of enthalpy exchanger 125 relative to the efficiency of enthalpy exchanger 106 further still.

As in enthalpy exchangers 91, 98 and 101 according to FIGS. 20-28, in enthalpy exchanger 125 two groups of three enthalpy exchanger panels are disposed on either side of enthalpy exchanger 125. This embodiment also draws advantage from the inclining arrangement of enthalpy exchanger panels 35 at angles of about 20° and their mutual angles of about 25°. An inflow on all sides is hereby more or less approximated.

Just as in enthalpy exchanger 106, trestle 95 with drive motor 41 supports via a bottom plate 127 on the ground 96. Enthalpy exchanger 125 is very low-noise due to the complete vibration decoupling obtained hereby.

Figure 44:
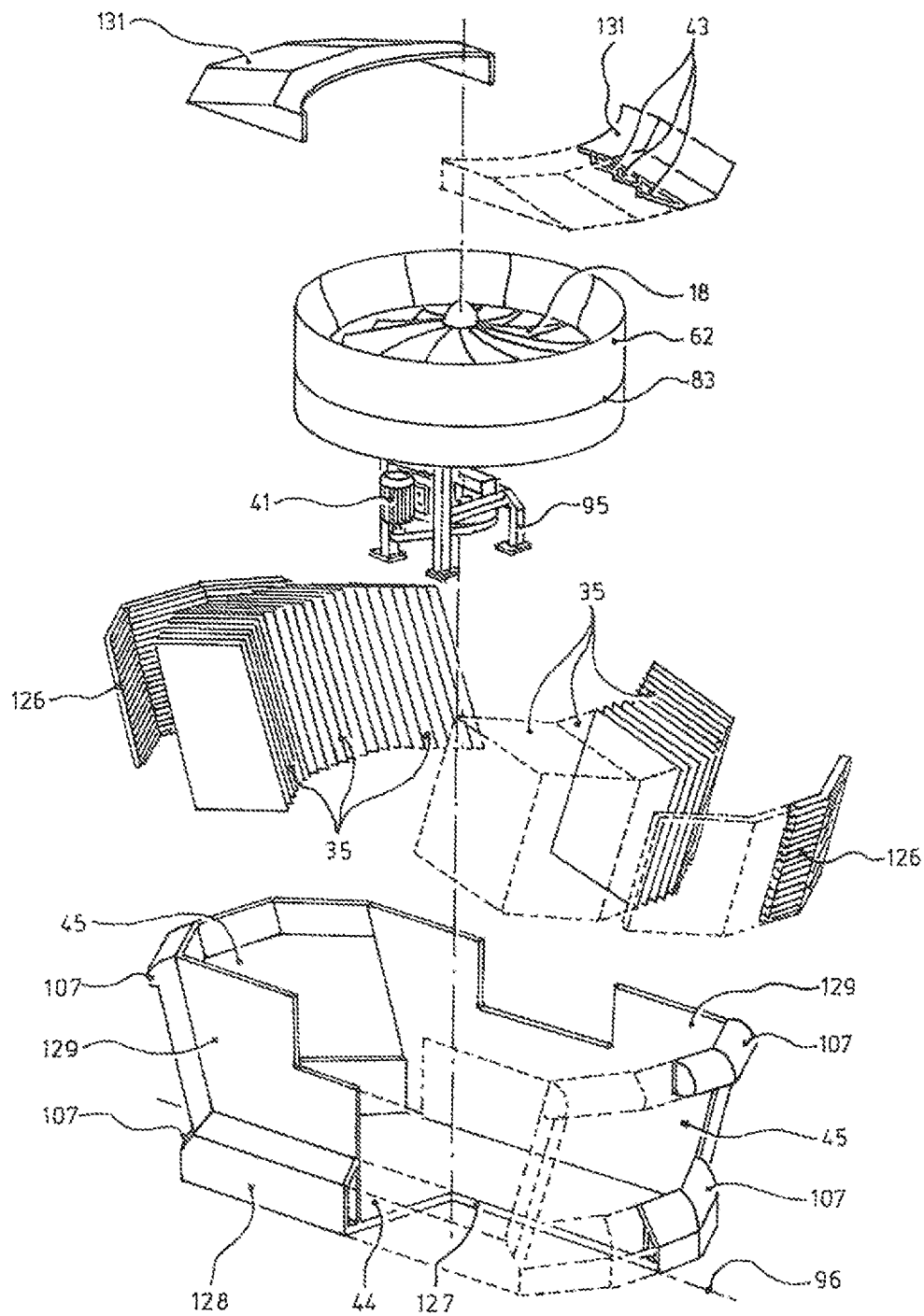
FIG. 44 shows an exploded view of the enthalpy exchanger according to FIGS. 40, 41, 42 and 43, which shows that this enthalpy exchanger consists of a very limited number of prefabricated parts.

FIG. 44 shows an exploded view which is drawn partially cut-away and partially transparent. The exploded view shows all the parts and assemblies of parts of enthalpy exchanger 125 prefabricated in the factory. The small number of parts from which enthalpy exchanger 125 can be assembled is noticeable. It is recommended under all circumstances to produce as much work as possible under the fully controlled circumstances in a factory, and to perform as little assembly work as possible in situ.

A more or less basin-like housing comprises bottom plate 127 of fibre-reinforced polyester to which a steel plate of about 10 mm thick is glued. Extending around the periphery is an upright wall part 128 which is constructed from glass fibre-reinforced polyester or a sandwich construction of polyester or steel plate with a foam filling of for instance polyurethane or polyisocyanurate. A basin structure which fulfills the function of water collecting reservoir 44 is hereby obtained.

Extending from the mutually parallel longitudinal edges of peripheral wall part 128 are two upright side walls 129 which are manufactured from plastic, particularly polyester, reinforced with tensively strong fibres. Edge parts 107 with the above described streamlined shape are situated between the end zones of the lower sides of these walls 129 and the upper side thereof.

The inlet openings which serve to let supply airflows 47 through to inlet grids 126 are defined between the end zones of side walls 129.

Enthalpy exchanger 125 is covered by two units 131, each comprising three water supply containers 43.

Because trestle 95 rests via heavy bottom plate 127 on the ground 96 and the rest of the structure is completely isolated from all moving fan parts, enthalpy exchanger 125 is very low-noise.

Edge parts 107 with streamlined shape extend around inlet openings 45.

The structure of enthalpy exchanger 125 is very simple.

Because the more or less basin-like housing of enthalpy exchanger 125 according to FIG. 44 consists for the major part of plastic and the use of steel plates as according to the prior art is entirely dispensed with, and units 131 with water supply containers 43 are also manufactured from reinforced plastic, particularly polyester, enthalpy exchanger 125 is very light compared to the prior art enthalpy exchanger 32. The diameter of fans 18 as applied in enthalpy exchangers 106 according to FIG. 33 and FIGS. 40, 41, 42, 43 and 44 lies in the order of 2.4 m, while the motor power amounts to about half the motor power necessary for operating enthalpy exchanger 32 according to FIG. 8, which is about 18 kW. It is also possible to consider also increasing the power with which motor 41 is operated in said enthalpy exchangers according to the invention to 35 kW. The intensity of the airflows is proportional to the rotation speed and, although it will not bring about a quadrupling of the intensity of the airflows, a doubling of the drive motor power will therefore bring about in any case a very substantial increase thereof, which far exceeds the intensity which can be obtained with the prior art enthalpy exchanger.

A protective grid can if desired be added to any enthalpy exchanger according to the invention on the blow-out side of the fan. In the case of an assembly of enthalpy exchangers, such a grid can if desired extend over more than one fan opening.

The use of plastic structural parts for an enthalpy exchanger according to the invention has the advantage of a low price, a low weight, a high degree of corrosion resistance and, particularly in the case of sandwich panels, a high degree of internal damping, whereby sound production is suppressed to great extent, certainly compared to metal panels.

The use of the superior fan according to the invention, which can be operated at relatively low rotation speed, also has the advantage that the rotation component in the out-flowing air is considerably smaller than is the case in the usual prior art fan 5.

A comparison between FIGS. 11 and 33, which show respectively a prior art enthalpy exchanger and a similarly dimensioned enthalpy exchanger according to the invention, immediately demonstrates that there is a certain relation between the two. The differences between the prior art and the invention have however been clearly described in the foregoing specification. In the light thereof it will be apparent which steps need to be taken in order to upgrade enthalpy exchanger 32 according to FIG. 11 by converting it into an enthalpy exchanger 106 according to the invention, as drawn in FIG. 33.

It will be apparent from the foregoing that the principals according to the invention make a very light and inexpensive structure of an enthalpy exchanger possible, and that the performance relative to the prior art has also improved spectacularly.

The invention claimed is:

1. An enthalpy exchanger for changing the enthalpy of a throughflow medium, i.e. a liquid, a gas or a two-phase medium, which enthalpy exchanger comprises:
   at least one air inlet;
   at least one enthalpy exchanger panel connecting to each air inlet and configured to guide medium such that during operation this medium exchanges enthalpy with airflows let through by the or each air inlet;
   an air throughflow space connecting to the at least one enthalpy exchanger panel;
   such that air can flow into the air throughflow space via the air inlets and the enthalpy exchanger panels;
   a fan which connects to the air throughflow space and has a central axis which is also the rotation axis of the rotor of the fan, which draws in and blows out air via the air inlets, the enthalpy exchanger panels and the air throughflow space; and
   electrical drive means added to the fan;
   wherein the ratio of the effective throughflow area of the fan and the total effective throughflow area of the relevant air inlets amounts to a maximum of about 0.3;
   added to the fan is a rotation-symmetrical airflow-guiding element which extends both upstream relative to the fan, in the air throughflow space, and downstream relative to the fan, on the outer side of the enthalpy exchanger;
   the airflow-guiding element has a streamlined shape in both its upstream zone and its downstream zone;
   the airflow-guiding element has in its downstream end zone a concave inner surface, smoothly transposing towards the fan into a locally at least approximately partly toroidal, convex remaining inner surface of the airflow- guiding element and having a continuously decreasing cross-section towards the fan;
   the airflow-guiding element has in its upstream end zone a convex inner surface having a continuously decreasing cross-section towards to the fan;
   the fan comprises a number of aerodynamically formed blades arranged in angularly equidistant manner on a coaxially placed hub and with outer end zones which are mutually connected by a concentric ring which fits with some clearance into a correspondingly formed annular recess in the airflow-guiding element, such that the inner surfaces of the ring and the airflow-guiding element connect substantially smoothly to each other without appreciably affecting the airflow through the fan.

2. The enthalpy exchanger as claimed in claim 1, wherein:
   at least two air inlets are disposed symmetrically in pairs on either side of a median plane defined in the enthalpy exchanger;
   at least two enthalpy exchanger panels are disposed symmetrically in pairs relative to the median plane;
   the central axis of the fan extends in the median plane; and
   the fan is disposed symmetrically relative to the median plane.

3. The enthalpy exchanger as claimed in claim 2, wherein:
   an airflow deflection element is disposed on the side of the air throughflow space remote from the fan for the purpose of smoothly deflecting each airflow from the adjoining end zone of the relevant enthalpy exchanger panel and in the direction of the central zone of the fan;
   the deflection element has a form which is minor-symmetrical relative to the median plane and which has two smoothly rounded convex lower edges which transpose smoothly into respective concave deflection surfaces, which converge in a ridge which is located in the median plane and where the concave deflection surfaces form an acute angle with each other.

4. The enthalpy exchanger as claimed in claim 3, wherein:
   the medium can flow through the enthalpy exchanger panels, such that enthalpy is exchanged between the medium and the passing air during operation; and
   the airflow-guiding element comprises the one manifold of an enthalpy exchanger panel and the deflection element comprises the other manifold of this enthalpy exchanger panel.

5. The enthalpy exchanger as claimed in claim 1, wherein:
   the device comprises a frame supported by the ground;
   the central axis of the fan extends in vertical direction; and
   the fan and the drive means are supported directly by the ground.

6. The enthalpy exchanger as claimed in claim 1, wherein:
   the medium flows via medium application means over the outer surfaces of the enthalpy exchanger panels in the form of a film, and evaporates at least partially while extracting enthalpy from the unevaporated medium, which unevaporated medium is collected by medium collecting means and is optionally discharged for reuse.

7. The enthalpy exchanger as claimed in claim 6, wherein:
   the enthalpy exchanger panels around which flow of medium and the airflows occurs are embodied as corrugated plates with a corrugated profile, wherein the corrugations have wave shapes which are identical and disposed adjacently of each other in the principal plane of the corrugated plates.

8. The enthalpy exchanger as claimed in claim 7, wherein: the plates consist of PVC.

9. The enthalpy exchanger as claimed in claim 1, wherein:
   a pattern of mutually parallel, identical louvres placed on the outer side is added to each air inlet;
   which louvres each have a more or less sinusoidal sectional form with a length of one wavelength, and the tangents to the inlet zone and the outlet zone of each louvre are mutually parallel;
   which louvres have mutual distances such that there are no lines of sight between the entry side and the exit side of the pattern of louvres; and
   the louvres have matte black surfaces;
   such that light cannot reach the enthalpy exchanger panels from outside.

10. The enthalpy exchanger as claimed in claim 9, wherein:
    the louvres are disposed such that the inlet zones and the outlet zones of the louvres extend in the direction of the airflow entering from outside.

11. The enthalpy exchanger as claimed in claim 9, wherein:
    the ratio of the wavelength and the amplitude of the wave shapes amounts to a minimum of 3.

12. The enthalpy exchanger as claimed in claim 1, wherein:

the enthalpy exchanger panels each have an angle of inclination in the range of 8°-30° relative to the median plane, and the air throughflow space has a form widening in the direction of the area of the fan.

13. The enthalpy exchanger as claimed in claim 1, wherein:

a screen through which at least some air can flow extends in the median plane, particularly of stainless steel, with an openness of 30%-70%.

14. The enthalpy exchanger as claimed in claim 1, wherein:

the airflow-guiding element comprises a foam core and a jacket enclosing this core; and the foam consists of plastic.

15. The enthalpy exchanger as claimed in claim 1, wherein:

the drive means are located outside the airflows in the air throughflow space.

16. The enthalpy exchanger as claimed in claim 1, wherein:

the enthalpy exchanger panels are disposed such that they define in a plane extending perpendicularly of the central axis of the fan a cross-sectional form which at least approximates the form of a polygon which is symmetrical relative to the median plane.

17. The enthalpy exchanger as claimed in claim 1, wherein:

the airflow-guiding element has in its downstream end zone a converging axial annular protrusion formed by mutually connecting surfaces, i.e. a concave inner surface and a substantially cylindrical or at least to some extent concave outer surface, these surfaces smoothly transposing on their sides remote from the protrusion into the locally at least approximately partly toroidal, convex remaining surfaces of the airflow-guiding element.

18. The enthalpy exchanger as claimed in claim 1, comprising:

a housing consisting substantially of plastic, comprising one or more foam plastic cores and jackets of this same plastic in solid form which enclose these cores.

19. An assembly of enthalpy exchangers as claimed in claim 1, comprising:

at least one group of at least two enthalpy exchangers disposed relative to each other such that their median planes are coplanar and their air throughflow spaces are assembled into one combined air throughflow space;

a number of windbreaks shielding the enthalpy exchanger panels, the air throughflow spaces and the fans from wind on all sides and having a combined form narrowing toward the area of the outflow zones of the fans, such that the windbreaks shield the air blown out by the fans from wind, such that this wind has only a negligible effect on the flow pattern of this air blown out by the fans, and the air inlets are left completely clear.

20. A method for converting an enthalpy exchanger for changing the enthalpy of a throughflow medium, which enthalpy exchanger comprises:

at least one air inlet;

at least one enthalpy exchanger panel connecting to each air inlet and configured to guide medium, such that during operation this medium exchanges enthalpy with airflows let through by the or each air inlet;

a combined air throughflow space connecting to all enthalpy exchanger panels;

such that air can flow into the air throughflow space via the air inlets and the enthalpy exchanger panels;

a fan connecting to the air throughflow space and having a central axis, this also being the rotation axis of the rotor of the fan, which draws in and blows out air via the air inlets, the enthalpy exchanger panels and the air throughflow space; and electrical drive means added to the fan;

into an enthalpy exchanger as claimed in claim 1, which has the special features that the ratio of the effective throughflow area of the fan and the total effective throughflow area of the relevant air inlets amounts to a maximum of about 0.3;

added to the fan is a rotation-symmetrical airflow-guiding element which extends both upstream relative to the fan, in the air throughflow space, and downstream relative to the fan, on the outer side of the enthalpy exchanger;

the airflow-guiding element has a streamlined shape in both its upstream zone and its downstream zone; and the fan comprises a number of blades with free end zones which are mutually connected by a concentric ring which fits with some clearance into a correspondingly formed annular recess in the airflow-guiding element, such that the inner surfaces of the ring and the airflow-guiding element connect substantially smoothly to each other without appreciably interfering with the passing air;

the airflow-guiding element has in its downstream end zone a concave inner surface, smoothly transposing towards the fan into a locally at least approximately partly toroidal, convex remaining inner surface of the airflow- guiding element and having a continuously decreasing cross-section from the end zone towards the fan;

the airflow-guiding element has in its upstream end zone a convex inner surface having a continuously decreasing cross-section towards to the fan;

which method comprises the following steps of:

(a) adding to the fan a rotation-symmetrical airflow-guiding element which extends both upstream relative to the fan, in the air throughflow space, and downstream relative to the fan, on the outer side of the enthalpy exchanger;

(b) replacing the fan with a fan comprising a number of aerodynamically formed blades arranged in angularly equidistant manner on a coaxially placed hub and with outer end zones which are mutually connected by a concentric ring which fits with some clearance into a correspondingly formed annular recess in the airflow-guiding element, such that the inner surfaces of the ring and the airflow-guiding element connect substantially smoothly to each other without appreciably affecting the passing air.

* * * * *